US012777377B2

(12) United States Patent
Zhang

(10) Patent No.: US 12,777,377 B2
(45) Date of Patent: Oct. 27, 2026

(54) COMMUNICATIONS SYSTEM FOR IMPROVING TELEPHONE CALL COMPLETION RATE IN SA NETWORK AND USER EQUIPMENT

(71) Applicant: Honor Device Co., Ltd., Shenzhen (CN)

(72) Inventor: Zhongli Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 460 days.

(21) Appl. No.: 18/252,046

(22) PCT Filed: Mar. 7, 2022

(86) PCT No.: PCT/CN2022/079559
§ 371 (c)(1),
(2) Date: May 8, 2023

(87) PCT Pub. No.: WO2022/252725
PCT Pub. Date: Dec. 8, 2022

(65) Prior Publication Data

US 2024/0015604 A1 Jan. 11, 2024

(30) Foreign Application Priority Data

May 31, 2021 (CN) ......................... 202110603231.1

(51) Int. Cl.
*H04W 36/00* (2009.01)
*H04W 36/30* (2009.01)

(52) U.S. Cl.
CPC ................ *H04W 36/00226* (2023.05); *H04W 36/305* (2018.08)

(58) Field of Classification Search
CPC ......... H04W 36/00226; H04W 36/305; H04W 36/00224; H04W 76/18; H04W 36/0022; H04W 24/04; H04W 36/14
(Continued)

(56) References Cited

U.S. PATENT DOCUMENTS

2016/0029228 A1* 1/2016 Mufti .................... H04W 24/04 370/225
2019/0281506 A1 9/2019 Chiang et al.
(Continued)

FOREIGN PATENT DOCUMENTS

CN 101925146 A 12/2010
CN 105792296 A 7/2016
(Continued)

OTHER PUBLICATIONS

Qualcomm Incorporated, "UE Radio Capability for IMS Voice", 3GPP TSG-RAN WG2 AH1807, R2-1809486, Montreal, Canada, Jul. 2-6, 2018, 6 pages.

*Primary Examiner* — Michael Y Mapa
(74) *Attorney, Agent, or Firm* — Conley Rose, P.C.

(57) ABSTRACT

In a scenario in which calling UE resides in an LTE network or a 5G SA network and called UE resides in the 5G SA network, when the calling UE fails to call the called UE through an IMS domain, the calling and called ends cooperatively execute a call saving policy: the calling UE performs a call retry, for example, when a VoNR call or an EPS fallback call fails, falls back to LTE to initiate a VoLTE call retry, or initiates a CSFB call retry on LTE when the VoLTE call fails. The called UE falls back to the LTE network or a CS domain, and cooperates with the calling UE to complete the call. In this way, a probability that the UE successfully initiates a call can be improved, a call requirement of a user can be met, and call experience of the user can be improved.

20 Claims, 8 Drawing Sheets

(58) Field of Classification Search
USPC .................................... 455/436–444; 370/331
See application file for complete search history.

(56) References Cited

U.S. PATENT DOCUMENTS

| | | | | |
|---|---|---|---|---|
| 2019/0394688 | A1 | 12/2019 | Zhu et al. | |
| 2020/0137609 | A1 * | 4/2020 | Jung | H04W 24/10 |
| 2020/0383010 | A1 | 12/2020 | Zhu et al. | |
| 2021/0037430 | A1 * | 2/2021 | Jin | H04W 76/27 |
| 2021/0051530 | A1 | 2/2021 | Venkataraman et al. | |
| 2021/0345185 | A1 * | 11/2021 | Kodali | H04W 36/0085 |
| 2022/0167244 | A1 * | 5/2022 | Zaus | H04L 69/24 |
| 2023/0086087 | A1 * | 3/2023 | Shen | H04W 8/24<br>370/328 |
| 2023/0239952 | A1 * | 7/2023 | Shi | H04L 65/1016<br>370/329 |
| 2023/0239962 | A1 * | 7/2023 | Gao | H04W 52/0254<br>370/230 |

FOREIGN PATENT DOCUMENTS

| | | | |
|---|---|---|---|
| CN | 107124428 | A | 9/2017 |
| CN | 108934050 | A | 12/2018 |
| CN | 110876169 | A | 3/2020 |
| CN | 111372327 | A | 7/2020 |
| CN | 113438679 | A | 9/2021 |

* cited by examiner

COMMUNICATIONS SYSTEM FOR IMPROVING TELEPHONE CALL COMPLETION RATE IN SA NETWORK AND USER EQUIPMENT

CROSS-REFERENCE TO RELATED APPLICATIONS

This application is a U.S. National Stage of International Application No. PCT/CN2022/079559 filed on Mar. 7, 2022, which claims priority to Chinese Patent Application No. 202110603231.1, filed with the China National Intellectual Property Administration on May 31, 2021, both of which are incorporated herein by reference in their entireties.

TECHNICAL FIELD

This application relates to the field of communications technologies, and in particular, to a communications system for improving a telephone call completion rate in an SA network and user equipment.

BACKGROUND

As a communication network evolves from the 4th generation mobile communication technology (4th generation mobile communication technology, 4G) to the 5th generation mobile communication technology (5th generation mobile communication technology, 5G), a voice service is still one of main services of an operator. Because call quality of the voice service directly affects call experience of a user, how to ensure quality of a call between user equipments (User Equipments, UEs) in a 5G network becomes an urgent problem to be resolved.

In an initial stage of 5G standalone (standalone, SA) network construction, due to incomplete network construction, some 5G SA cells have insufficient performance (referred to as problematic SA cells). When UE resides in a problematic 5G SA cell, the following problem may occur: After the UE receives a call request, a call is abnormally released by a network in a setup phase due to a network, resulting in a call failure, thereby seriously affecting user experience.

SUMMARY

This application provides a communications system for improving a telephone call completion rate in an SA network and user equipment. In a scenario in which a call fails when calling UE resides in an LTE network or a 5G SA network and called UE resides in the 5G SA network, the calling and called ends cooperatively execute a call saving policy: The calling UE performs a call retry. The called UE falls back to the LTE network or a CS domain, and cooperates with the calling UE to complete the call retry. In this way, a probability that the UE successfully initiates a call can be improved, a call requirement of a user can be met, and call experience of the user can be ensured.

To achieve the foregoing objectives, the following technical solutions are used in this application.

According to a first aspect, this application provides a communications system. The communications system includes first UE and second UE, the first UE resides in a 5G SA network or a long term evolution LTE network, and the second UE resides in the 5G SA network.

The first UE is configured to initiate a multimedia subsystem IMS domain-based voice call to the second UE, where the multimedia subsystem IMS domain-based voice bearer includes a voice over long term evolution VoLTE, or a voice over new radio VoNR, or an evolved packet system fallback EPS fallback.

The first UE is further configured to: fall back to an LTE network and initiate a VoLTE call retry to the second UE on the LTE network, in response to a fact that the VoNR or EPS fallback call initiated by the first UE is abnormally released by a network in a setup phase, or initiate a circuit switched fallback CSFB call retry to the second UE on the LTE network in response to a fact that the VoLTE call initiated by the first UE is abnormally released by the network in the setup phase.

The second UE is configured to fall back to the LTE network or a CS domain in response to a fact that a call is abnormally released by the network in the setup phase.

According to the solution provided in this application, in a scenario in which calling UE (that is, the first UE) resides in the LTE network or the 5G SA network and called UE (that is, the second UE) resides in the 5G SA network, when the calling UE fails to call the called UE through an IMS domain (for example, VoNR, EPS fallBack, or VoLTE), the calling and called ends cooperatively execute a corresponding call saving policy: The calling UE performs a call retry, for example, initiates the VoLTE call retry after falling back to LTE when the VoNR or EPS fallback call fails, or initiates the CSFB call retry on LTE when the VoLTE call fails. The called UE falls back to the LTE network or the CS domain, and cooperates with the calling UE to complete the call retry. The called UE falls back to the LTE network or the CS domain to avoid a case in which the call is abnormally released because an SA cell in which the called UE resides is problematic. In this way, a probability that the UE successfully initiates a call can be improved, a call requirement of a user can be met, and call experience of the user can be ensured.

In some embodiments, the second UE is further configured to receive, after sending a session progress (183 Session Progress) message to a network side, a call cancel message sent by the network side, where the call cancel message carries a cause value 503 indicating that the call is abnormally released in the setup phase. The first UE is further configured to receive, after receiving the session progress message sent by the network side, a call exception message sent by the network side, where the call exception message carries the cause value 503 indicating that the call is abnormally released in the setup phase.

In some embodiments, the second UE supports VoNR and VoLTE.

In some embodiments, the second UE is specifically configured to: in response to a fact that the call is abnormally released by the network in the setup phase, continue to reside in the 5G SA network if the second UE meets a specific condition, w % here the specific condition is that the UE is in a screen-on state, the UE is running a first-type application in the foreground, and a data flow corresponding to the first-type application is transmitted through a wireless communication network.

In some other embodiments, the second UE is specifically configured to: in response to a fact that the call is abnormally released by the network in the setup phase, fall back from the 5G SA network to the LTE network if the second UE meets a first preset condition. The first preset condition may be any one of the following:

the UE is in a screen-off state;

the UE is in the screen-on state, the UE is running the first-type application in the foreground, and the data flow corresponding to the first-type application is transmitted through a network other than the wireless communication network, and the UE is in the screen-on state, and the UE is running a second-type application in the foreground or is not running an application in the foreground.

It should be noted that the wireless communication network described in this embodiment of this application is a network that implements communication through a base station (for example, a 4G base station or a 5G base station). The wireless communication network may also be referred to as a cellular network, a mobile network, or a mobile communication network.

The network other than the wireless communication network may include a wireless local area network, for example, a Wi-Fi network.

The first-type application is one or more game applications that need to be run by the UE in an online manner. It may be understood that the first-type application may not include a standalone game application because the standalone game application may support running when the UE is not networked.

The second-type application may be an application other than the first-type application. The second-type application may include a standalone game application.

In some embodiments, the second UE is specifically configured to: disable a 5G SA capability, trigger the second UE to initiate de-registration to the 5G SA network, and fall back from the 5G SA network to the LTE network; or assuming that an NR serving cell does not meet a resident condition, trigger the second UE to fall back from the 5G SA network to the LTE network through network searching: or report an LTE B1 event to the network side, and trigger the network side to indicate the second UE to redirect or be handed over to the LTE network; or prohibit the second UE from residing in an NR serving cell of a first public land mobile network PLMN, and trigger the second UE to reside in an LTE serving cell of the first PLMN, where the first PLMN is a PLMN with which the second UE has registered.

In some embodiments, the second UE is further configured to start a first timer when the second UE falls back to the LTE network, and the second UE suppresses 5G SA during starting of the first timer.

In some embodiments, that the second UE suppresses 5G SA includes: The second UE suppresses NR measurement, and/or the second UE disables the 5G SA capability.

In some embodiments, the second UE is further configured to send a UE capability message to the LTE network after the second UE falls back to the LTE network, where the UE capability message is used to indicate that the second UE does not support 5G.

In some embodiments, the second UE is further configured to cancel suppression of the 5G SA when the first timer expires and the second UE is not in a call state.

In some embodiments, the second UE is further configured to send a UE capability message to the LTE network after the call is successfully established, where the UE capability message is used to indicate that the second UE supports 5G.

In some embodiments, the first UE is further configured to: suppress NR measurement during the VoLTE call retry initiated by the first UE; and cancel suppression of the NR measurement after the call setup phase ends.

In some embodiments, the first UE is further configured to disable the 5G SA capability during the VoLTE call retry initiated by the first UE. The first UE is further configured to re-enable the SA capability after a call between the first UE and the second UE ends.

It should be noted that if the calling UE falls back to LTE by disabling the 5G SA capability, the calling UE re-enables the 5G SA capability after the call ends, to avoid impact of a change of the UE capability on the call process. If the calling UE falls back to LTE through network searching, handover, or redirection, the calling UE no longer suppresses the NR measurement after the call is successfully established (that is, after the called UE receives the call) or the call ends (for example, a failure scenario).

In some embodiments, the first UE is specifically configured to: assuming that the NR serving cell does not meet the resident condition, trigger the first UE to fall back to the LTE network through network searching; or disable the 5G SA capability, trigger the first UE to initiate de-registration to the 5G SA network, and fall back from the 5G SA network to the LTE network; or report an LTE B1 event to the network side, and trigger the network side to indicate the first UE to redirect or be handed over to the LTE network.

In some embodiments, the first UE is further configured to establish a call with the second UE in response to a fact that the first UE successfully calls the second UE. The second UE is further configured to establish a call with the first UE in response to a fact that the first UE successfully calls the second UE.

In some embodiments, the second UE is further configured to re-reside in the 5G SA network after the call between the first UE and the second UE ends.

In some embodiments, the second UE is further configured to: identify a first 5G SA cell as a problematic cell when the first 5G SA cell meets a second preset condition; and suppress, in first preset duration, the second UE to reside in the first 5G SA cell.

The second preset condition is that a 5G SA cell has no LTE neighboring cell; a value obtained by summing M and N is greater than a preset threshold in the second preset duration: and M is a quantity of times that the first UE receives the call exception message in the second preset duration after receiving the session progress message, and N is a quantity of times that the second UE receives the call cancel message in the second preset duration after sending the session progress message.

According to a second aspect, this application provides a method for improving a telephone call completion rate in an SA network. The method is applied to a calling end, and the method includes:

First UE initiates a multimedia subsystem IMS domain-based voice call to second UE, where the multimedia subsystem IMS domain-based voice bearer includes a voice over long term evolution VoLTE, or a voice over new radio VoNR, or an evolved packet system fallback EPS fallback; and the first UE resides in a 5G SA network or a long term evolution LTE network, and the second UE resides in the 5G SA network.

The first UE falls back to the LTE network and initiates a VoLTE call retry to the second UE on the LTE network, in response to a fact that the VoNR or EPS fallback call initiated by the first UE is abnormally released by a network in a setup phase, or initiates a circuit switched fallback CSFB call retry to the second UE on the LTE network in response to a fact that the VoLTE call initiated by the first UE is abnormally released by the network in the setup phase.

When the first UE initiates the VoLTE call retry to the second UE on the LTE network, the second UE has fallen back to the LTE network; or when the first UE initiates the CSFB call retry to the second UE on the LTE network, the second UE has fallen back to a CS domain.

In some embodiments, the method further includes: The first UE receives, after receiving a session progress message sent by a network side, a call exception message sent by the network side, where the call exception message carries a cause value 503 indicating that the call is abnormally released in the setup phase.

In some embodiments, the method further includes: The first UE suppresses NR measurement during the VoLTE call retry initiated by the first UE; and cancels suppression of the NR measurement after the call setup phase ends.

In some embodiments, the method further includes: The first UE disables a 5G SA capability during the VoLTE call retry initiated by the first UE. The first UE re-enables the SA capability after the call between the first UE and the second UE ends.

In some embodiments, that the first UE falls back to the LTE network includes: Assuming that an NR serving cell does not meet a resident condition, the first UE triggers the first UE to fall back to the LTE network through network searching; or the first UE disables the 5G SA capability, triggers the first UE to initiate de-registration to the 5G SA network, and falls back from the 5G SA network to the LTE network; or the first UE reports an LTE B1 event to the network side, and triggers the network side to indicate the first UE to redirect or be handed over to the LTE network.

In some embodiments, the method further includes: The first UE establishes a call with the second UE in response to a fact that the first UE successfully calls the second UE.

In some embodiments, the method further includes: The first UE identifies a first 5G SA cell as a problematic cell when the first 5G SA cell meets a second preset condition; and suppresses, in first preset duration, the first UE to reside in the first 5G SA cell.

The second preset condition may be that a 5G SA cell has no LTE neighboring cell; a value obtained by summing M and N is greater than a preset threshold in the second preset duration; and M is a quantity of times that the first UE receives the call exception message in the second preset duration after receiving the session progress message, and N is a quantity of times that the second UE receives the call cancel message in the second preset duration after sending the session progress message.

According to a third aspect, this application provides a method for improving a telephone call completion rate in an SA network. The method is applied to a called end, and the method includes:

Second UE receives a multimedia subsystem IMS domain-based voice call initiated by first UE, where the multimedia subsystem IMS domain-based voice bearer includes a voice over long term evolution VoLTE, or a voice over new radio VoNR, or an evolved packet system fallback EPS fallback; and the first UE resides in a 5G SA network or a long term evolution LTE network, and the second UE resides in the 5G SA network.

The second UE falls back to the LTE network or a CS domain in response to a fact that a call is abnormally released by a network in a setup phase.

In some embodiments, the second UE may fall back from the 5G SA network to the LTE network, and may further fall back from the LTE network to the CS domain.

In some embodiments, the method further includes: The second UE receives, after sending a session progress message to a network side, a call cancel message sent by the network side, where the call cancel message carries a cause value 503 indicating that the call is abnormally released in the setup phase. That the second UE falls back to the LTE network or a CS domain in response to a fact that a call is abnormally released by a network in a setup phase includes: The second UE falls back to the LTE network or the CS domain in response to the call cancel message.

In some embodiments, the second UE may support VoNR and VoLTE.

In some embodiments, the second UE is specifically configured to: in response to a fact that the call is abnormally released by the network in the setup phase, continue to reside in the 5G SA network if the second UE meets a specific condition, where the specific condition is that the UE is in a screen-on state, the UE is running a first-type application in the foreground, and a data flow corresponding to the first-type application is transmitted through a wireless communication network.

In some embodiments, the second UE is specifically configured to: in response to a fact that the call is abnormally released by the network in the setup phase, fall back from the 5G SA network to the LTE network if the second UE meets a first preset condition. The first preset condition is any one of the following:

- the UE is in a screen-off state;
- the UE is in the screen-on state, the UE is running the first-type application in the foreground, and the data flow corresponding to the first-type application is transmitted through a network other than the wireless communication network; and
- the UE is in the screen-on state, and the UE is running a second-type application in the foreground or is not running an application in the foreground.

In some embodiments, that the second UE falls back to the LTE network includes: The second UE disables a 5G SA capability, triggers the second UE to initiate de-registration to the 5G SA network, and falls back from the 5G SA network to the LTE network; or assuming that an NR serving cell does not meet a resident condition, the second UE triggers the second UE to fall back from the 5G SA network to the LTE network through network searching: or the second UE reports an LTE B1 event to the network side, and triggers the network side to indicate the second UE to redirect or be handed over to the LTE network.

In some embodiments, the method further includes: The second UE starts a first timer when the second UE falls back to the LTE network. The second UE suppresses 5G SA during starting of the first timer.

In some embodiments, that the second UE suppresses 5G SA includes: The second UE suppresses NR measurement, and/or the second UE disables the 5G SA capability.

In some embodiments, the second UE is specifically configured to:

When the second UE is in the screen-off state, duration of the first timer is first duration.

When the second UE is in the screen-on state, the second UE is running the first-type application in the foreground, and the data flow corresponding to the first-type application is transmitted through the network other than the wireless communication network, or when the second UE is in the screen-on state, and the second UE is running the second-type application in the foreground or is not running the application in the foreground, the duration of the first timer is second duration.

The first duration is greater than the second duration.

In some embodiments, the first duration is 30 minutes, and the second duration is 3 minutes.

In some embodiments, after the second UE falls back to the LTE network, the method further includes: The second UE sends a UE capability message to the LTE network, where the UE capability message is used to indicate that the second UE does not support 5G.

In some embodiments, after the second UE starts the first timer, the method further includes: The second UE cancels suppression of 5G SA when the first timer expires and the second UE is not in a call state.

In some embodiments, the method further includes: The second UE sends a UE capability message to the LTE network after the call is successfully established, where the UE capability message is used to indicate that the second UE supports 5G.

In some embodiments, the method further includes: The second UE establishes a call with the first UE in response to a fact that the first UE successfully calls the second UE.

In some embodiments, the method further includes: The second UE re-resides in the 5G SA network after the call between the first UE and the second UE ends.

In some embodiments, the method further includes: The second UE identifies a first 5G SA cell as a problematic cell when the first 5G SA cell meets a second preset condition; and suppresses, in first preset duration, the second UE to reside in the first 5G SA cell.

The second preset condition is that a 5G SA cell has no LTE neighboring cell; a value obtained by summing M and N is greater than a preset threshold in the second preset duration: and M is a quantity of times that the first UE receives the call exception message in the second preset duration after receiving the session progress message, and N is a quantity of times that the second UE receives the call cancel message in the second preset duration after sending the session progress message.

According to a fourth aspect, this application provides an apparatus for improving a telephone call completion rate in an SA network. The apparatus includes units configured to perform the method according to the second aspect. The apparatus may correspond to the method described in the second aspect. For related descriptions of the units in the apparatus, refer to descriptions in the second aspect Details are not described herein again for brevity.

The method described in the second aspect may be implemented by hardware, or may be implemented by hardware executing corresponding software. The hardware or the software includes one or more modules or units corresponding to the foregoing functions, for example, a transceiver module or unit or a processing module or unit.

According to a fifth aspect, this application provides an apparatus for improving a telephone call completion rate in an SA network. The apparatus includes units configured to perform the method according to the third aspect. The apparatus may correspond to the method described in the third aspect. For related descriptions of the units in the apparatus, refer to descriptions in the third aspect. Details are not described herein again for brevity.

The method described in the third aspect may be implemented by hardware, or may be implemented by hardware executing corresponding software. The hardware or the software includes one or more modules or units corresponding to the foregoing functions, for example, a transceiver module or unit or a processing module or unit.

According to a sixth aspect, this application provides UE. The UE includes a processor. The processor is coupled to a memory, the memory is configured to store a computer program or instructions, and the processor is configured to execute the computer program or the instructions stored in the memory, so that the method according to the second aspect is performed. For example, the processor is configured to execute the computer program or the instructions stored in the memory, so that the apparatus performs the method according to the second aspect.

According to a seventh aspect, this application provides UE. The UE includes a processor. The processor is coupled to a memory, the memory is configured to store a computer program or instructions, and the processor is configured to execute the computer program or the instructions stored in the memory, so that the method according to the third aspect is performed. For example, the processor is configured to execute the computer program or the instructions stored in the memory, so that the apparatus performs the method according to the third aspect.

According to an eighth aspect, this application provides a computer-readable storage medium. The computer-readable storage medium stores a computer program (also referred to as instructions or code) used to implement the method according to the second aspect. For example, when the computer program is executed by a computer, the computer is enabled to perform the method according to the second aspect.

According to a ninth aspect, this application provides a computer-readable storage medium. The computer-readable storage medium stores a computer program (also referred to as instructions or code) used to implement the method according to the third aspect. For example, when the computer program is executed by a computer, the computer is enabled to perform the method according to the third aspect.

According to a tenth aspect, this application provides a chip, including a processor. The processor is configured to: read and execute a computer program stored in a memory, to perform the method according to the second aspect and any possible implementation of the second aspect, or the method according to the third aspect and any possible implementation of the third aspect. Optionally, the chip further includes the memory. The memory is connected to the processor through a circuit or a wire.

According to an eleventh aspect, this application provides a chip system, including a processor. The processor is configured to: read and execute a computer program stored in a memory, to perform the method according to the second aspect and the method according to the third aspect. Optionally, the chip system further includes the memory. The memory is connected to the processor through a circuit or a wire.

According to a twelfth aspect, this application provides a computer program product. The computer program product includes a computer program (also referred to as instructions or code). When the computer program is executed by a computer, the computer is enabled to implement the method according to the second aspect or the method according to the third aspect.

It may be understood that for beneficial effects of the second aspect to the twelfth aspect, refer to related descriptions in the first aspect. Details are not described herein again.

DESCRIPTION OF EMBODIMENTS

Figure 1:
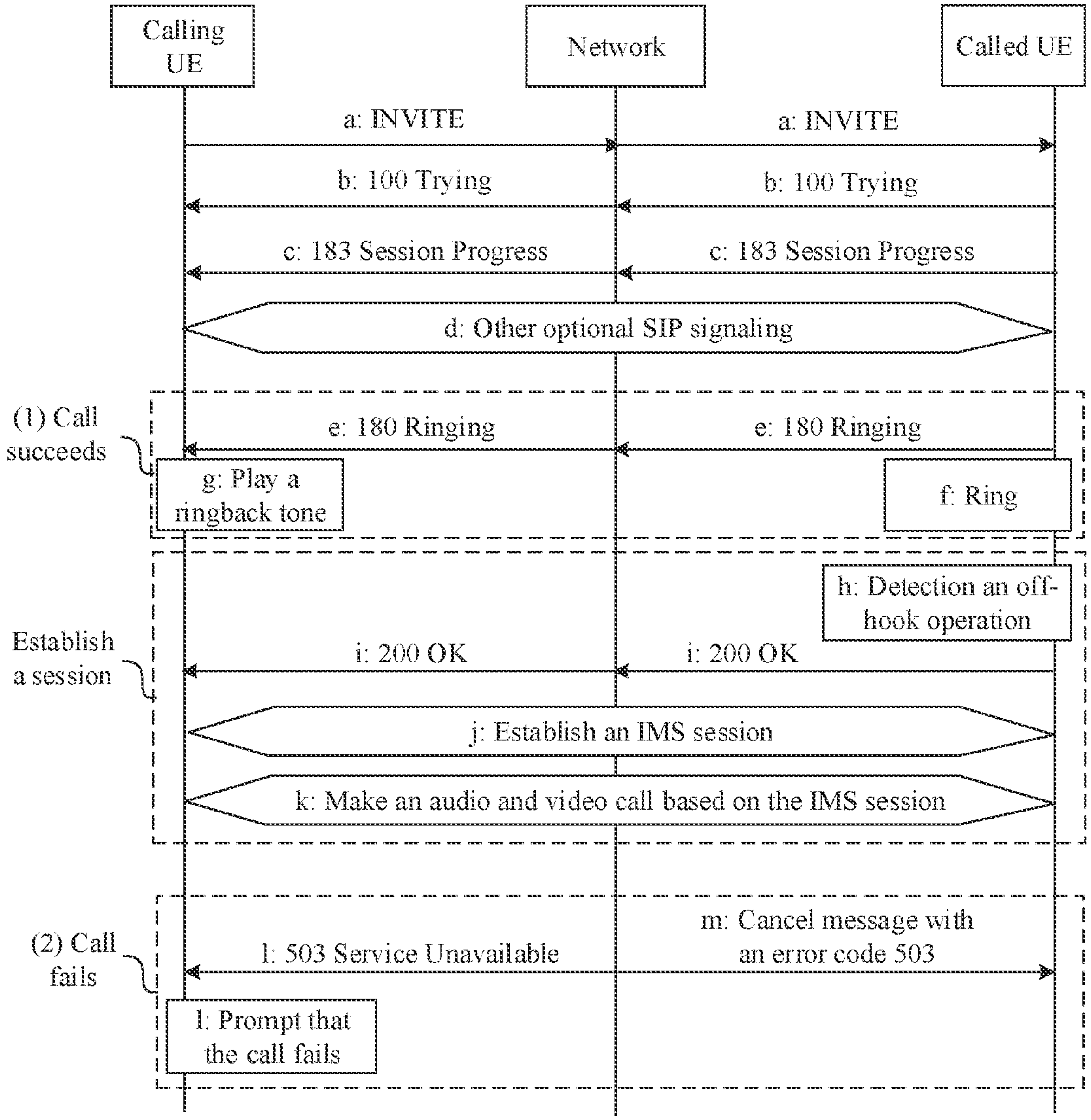
FIG. 1 is a schematic flowchart of a call between UEs according to an embodiment of this application.

To make the objectives, technical solutions, and advantages of embodiments of this application clearer, the technical solutions of embodiments of this application are described clearly and completely below with reference to the accompanying drawings in embodiments of this application. It is clear that the described embodiments are some but not all of the embodiments of this application. Based on embodiments of this application, all other embodiments obtained by a person of ordinary skill in the art without creative effort shall fall within the protection scope of this application.

In this specification, the term "and/or" is an association relationship for describing associated objects, and may indicate that three relationships may exist. For example, A and/or B may indicate the following three cases: Only A exists, both A and B exist, and only B exits. The symbol "/" in this specification indicates an "or" relationship between the associated objects, for example, A/B indicates A or B.

The terms "first", "second", and the like in this specification and the claims are used to distinguish between different objects, but are not used to describe a specific sequence of the described objects. For example, a first timer and a second timer are used to distinguish between different timers, but are not used to describe a specific sequence of the timers.

In embodiments of this application, a word such as "example" or "for example" is used to represent an example, an illustration, or a description. Any embodiment or design solution described in embodiments of this application as "example" or "for example" should not be construed as preferred or advantageous over other embodiments or design solutions. Exactly, use of a word such as "example" or "for example" is intended to present related concepts in a specific manner.

In descriptions of embodiments of this application, unless otherwise specified, "a plurality of" means two or more, for example, a plurality of processing units means two or more processing units, and a plurality of elements means two or more elements.

In the following embodiments of this application, a call refers to a process in which one UE initiates an audio and video call request to another UE through a specific network. One UE initiating a call request is calling UE, and another UE receiving the call request is called UE. After the called UE accepts the call request, a call can be made between the calling UE and the called UE, that is, multimedia data such as a voice and a video can be transmitted between the calling UE and the called UE, to provide multimedia services such as the voice and the video for users at the two ends.

In an initial stage of 5G SA network construction, due to incomplete network construction, some SA cells (problematic SA cells) have insufficient performance. When UE resides in a problematic SA cell, the following problem may occur: After the UE receives a call request, a call is abnormally released by a network in a setup phase due to the network, resulting in a call failure, thereby seriously affecting user experience.

A call process is described below with reference to FIG. 1. It is assumed that the calling UE resides in an SA cell or an LTE cell and the called UE resides in the SA cell. It should be noted that a process of initiating a call by the calling UE shown in FIG. 1 is a simplified example. In a specific implementation, more or less signaling interaction may be included between the calling UE, the called UE, and the network. For details, refer to a standard protocol. Details are not described herein.

As shown in FIG. 1, a process in which the calling UE calls the called UE may include the following steps:

Step a: The calling UE sends a call request message (INVITE message) to the called UE through a network.

Correspondingly, the called UE receives the call request message sent by the network.

Step b: The called UE sends a 100 Trying message to the calling UE through the network, where the 100 Trying message indicates that the INVITE message has been received.

Step c: The called UE sends a session progress message (183 Session Progress message) to the calling UE through the network to indicate a session establishment progress.

Step d: The calling UE, the called UE, and the network may perform other session initiation protocol (session initiation protocol, SIP) signaling interaction.

Refer to FIG. 1. After step a to step d are performed, there may be two results: (1) A call succeeds. For specific steps, refer to step e to step g. Further, after the call succeeds, a session may be established between the calling UE and the called UE. For specific steps, refer to step h to step k. (2) A call fails. For specific steps, refer to step l to step n.

Step e: The called UE sends 180 Ringing to the calling UE through the network.

Step f: The called UE rings.

Step g: The calling UE plays a ringback tone.

Therefore, the calling UE has successfully called the called UE.

In this embodiment of this application, the calling UE may determine, based on whether 180 Ringing is received, whether to successfully call the called UE. If the calling UE receives 180 Ringing, the calling UE is successfully called. If the calling UE does not receive 180 Ringing during expiration, the call fails. In this embodiment of this application, 180 Ringing may also be referred to as a response message.

Step h: The called UE detects an off-hook operation.

Step i: In response to the off-hook operation, the called UE sends 200 OK to INVITE to the calling UE through the network.

Step j: The calling UE and the called UE establish an IMS session.

Step k: The calling UE and the called UE make an audio and video call based on the IMS session.

In brief, in steps a to k, the calling UE and the called UE first respectively establish corresponding bearers, and then establish the IMS session based on the established bearers. The bearer includes a default bearer and a voice-dedicated bearer, and is established between the UE and a public data network (public data network, PDN). The default bearer is used to carry control signaling such as the INVITE messages in a call process. The voice-dedicated bearer is used to carry a voice packet and/or a video stream of a media plane. The IMS session is used to transmit audio and video data in a call process between the calling UE and the called UE. In this process, after the called UE sends the 180 Ringing message to the calling UE, the calling UE successfully calls the called UE.

The foregoing describes a process in which the call succeeds and the session is established after the call succeeds. The following describes, from another perspective, a process in which a call is abnormal or fails after step a to step d are performed. That a call fails means that the calling UE fails to call the called UE.

Step 1: The calling UE receives a service unavailable message (503 Service Unavailable message) sent by the network, where the service unavailable message indicates that the call fails. For a format of the 503 service unavailable message, refer to the following:

```
    SIP/2.0 503 Service Unavailable
    Via: SIP/2.0/TCP 71.255.1.194:50042; branch=z9hG4bK5hOAGY591ovUAy
    Call-ID: dD3gC0qkAHTHpnq701e@71.255.1.194
    From: <sip:+8613801026652@home1.com>;tag=YaMClYR1d5cUlZ
    To: <tel:+8613801024084>;tag=0cbcbu09
    CSeq: 9 INVITE
    Warning:    399    03100.09919.A.450.404.228.255.255.00062.00000002.00000
"Insufficient Bearer Resource"
    Reason: Q.850; cause=41,SIP; cause=503
    Content-Length: 0
```

Step m: The called UE receives a SIP cancel message (Cancel message) sent by the network, where an error code is 503. For formats of the cancel message and the error code 503, refer to the following:

```
    CANCEL sip:71.255.1.172:50043 SIP/2.0
    Via:SIP/2.0/TCP                              172.21.152.100:9900;
branch=z9hG4bKolnj6mjhmrokm7m5xf0r7rf65;
    Role=3;Hpt=8e72_36;TRC=ffffffff-ffffffff
    Call-ID: asbc79vtuwcdddf28wecad087e2av9u2rwbu@172.21.150.33
    From:
<sip:13801026652@home1.com;user=phone;noa=subscriber;srvattri=national>;
    tag=taf7etbv
    To: <tel:+8613801024084>
    CSeq: 9 CANCEL
    Reason: SIP; cause=503; text="03077.08907.A.450.404.228.0.0.00062.00000002
Insufficient Bearer Resource"
    Max-Forwards: 70
    Content-Length: 0
```

It can be learned from step 1 and step m that after the called UE receives the call request, due to the network, the call is abnormally released by the network in a setup phase. Therefore, the call between the calling UE and the called UE fails, and the session cannot be established. An execution sequence of step 1 and step m is not limited.

It can be learned from the foregoing steps that when the calling UE resides in a new radio (new radio, NR) cell or an LTE cell and the called UE resides in a 5G SA network, the calling UE initiates a call to the called UE, but the called UE does not ring after receiving the call request, mainly because the call is abnormally released by the network in the setup phase before ringing due to the network, resulting in a call failure, thereby seriously affecting user experience.

In view of this, this application provides a method for improving a telephone call completion rate in an SA network and a communications system. According to the solution provided in this application, in a scenario in which a call fails when calling UE resides in an LTE network or a 5G SA network and called UE resides in the 5G SA network, when the calling UE fails to call the called UE through an IMS domain, the calling and called ends cooperatively execute a corresponding call saving policy: The calling UE performs a call retry. The called UE falls back to the LTE network or a CS domain, and cooperates with the calling UE to complete the call retry. In this way, a probability that the UE successfully initiates a call can be improved, a call requirement of a user can be met, and call experience of the user can be ensured.

Specifically, in the method for improving a telephone call completion rate in an SA network provided in this embodiment of this application, solutions of the following two call failure scenarios are mainly discussed.

Scenario 1: The calling UE resides in a 4G LTE network and the called UE resides in a 5G SA network. The calling UE initiates a call to the called UE to establish an IMS domain call, but the called UE does not ring after receiving a call request. Therefore, the call fails.

Scenario 2: The calling UE resides in a 5G SA network, and the called UE resides in the 5G SA network. The calling UE initiates a call to the called UE to establish an IMS domain call, but the called UE does not ring after receiving a call request. Therefore, the call fails.

The following first describes various voice solutions involved when the UE initiates a call according to embodiments of this application, then describes a system architecture to which the solutions of this application are applied, and further describes, in detail with reference to the system architecture and the various voice solutions, the solutions provided in Scenario 1 or Scenario 2 in this application.

For the descriptions of the voice solutions in embodiments of this application, in embodiments of this application, the method for improving a telephone call completion rate in an SA network provided in this application is mainly described by using an example in which a 4G voice service and a 5G voice service are processed.

The 4G voice service is mainly implemented by using multimedia subsystem (IP multimedia subsystem, IMS)-based voice over long term evolution (voice over long term evolution, VoLTE) or circuit switched fallback (circuit switched fallback, CSFB). VoLTE bears a voice service through a 4G network data domain, and an operator needs to newly create an IMS network element to implement a VoLTE procedure. CSFB controls, through the network, the UE to fall back to a circuit domain in the 2nd generation mobile telephone technology (2nd generation wireless telephone technology, 2G) or the 3rd generation mobile communication technology (3rd generation mobile communication technology, 3G) network to bear a voice service. The operator uses an existing established network to implement a voice call function of the user.

The 5G voice service is mainly implemented by using voice over new radio (voice over NR, VoNR) or evolved packet system fallback (evolved packet system fallback. EPS Fallback). In the 5G voice service, the VoNR voice service bears a voice service through a 5G network data domain, and the EPS fallback voice service bears a voice service through a 4G network data domain.

In embodiments of this application, the voice solution involved when the UE initiates a call may include but is not limited to VoNR, EPS fallback, VoLTE, CSFB, and the like. A specific implementation process of the voice solution is described in detail in the subsequent embodiments. Details are not described herein.

The 4G VoLTE voice service, the 5G VoNR voice service, and the EPS fallback voice service all need to provide voice services through an IMS network. For example, when the UE accesses a 5G network and registers with the IMS network, the UE may initiate a 5G VoNR voice service or an EPS fallback voice service through the 5G network. For another example, when the UE accesses a 4G network and registers with the IMS network, the UE may initiate a 4G VoLTE voice service through the 4G network.

Figure 2:
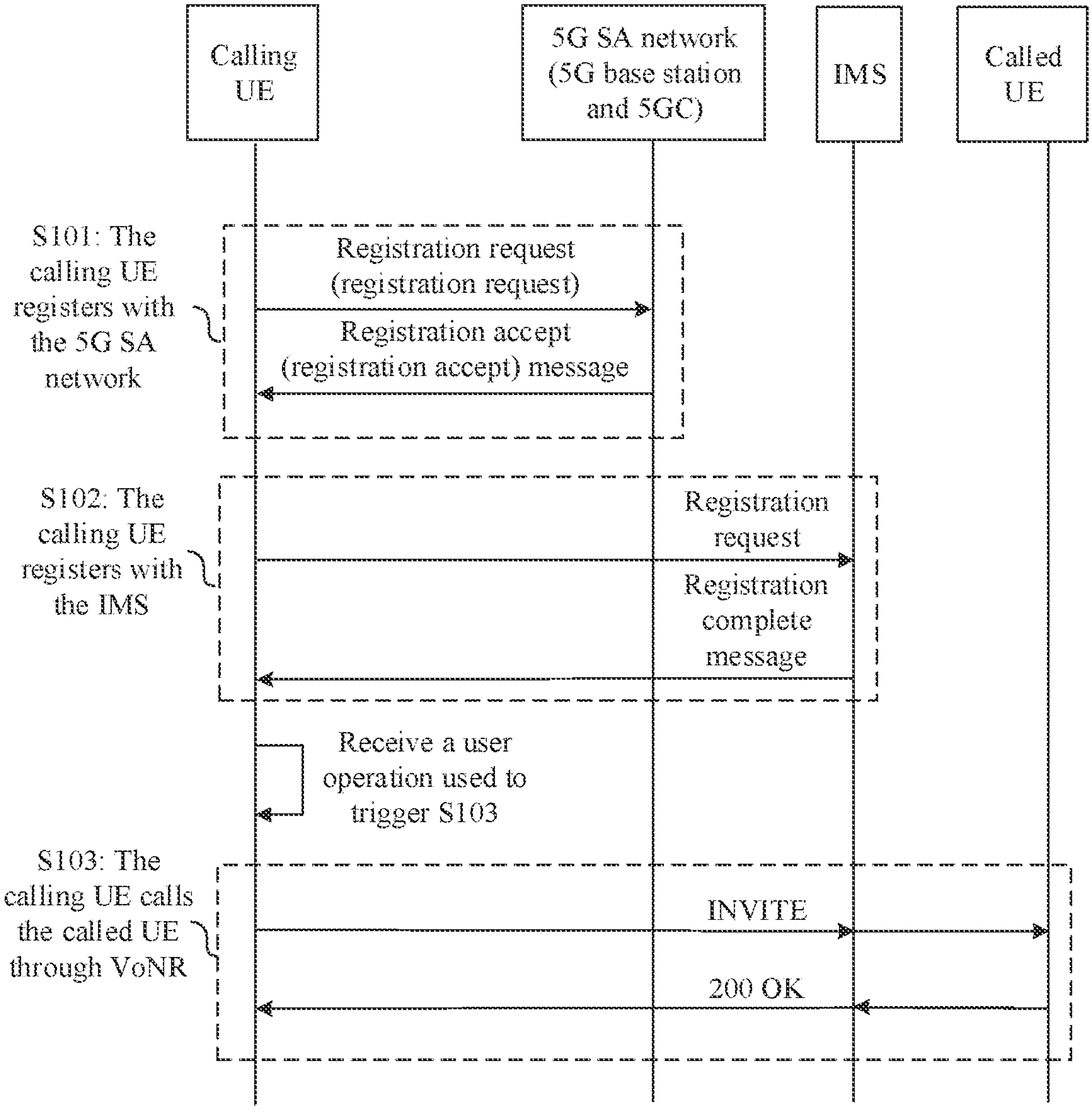
FIG. 2 is a schematic flowchart in which UE calls another UE through VoNR according to an embodiment of this application.

For example, a process in which the calling UE calls the called UE through the IMS network is described below with reference to FIG. 2. Refer to FIG. 2. The process may include the following steps:

S101: The calling UE registers with a 5G SA network.

The 5G SA network includes a 5G base station and a 5G core network (5G core network, 5GC). In a process of registering with the 5G SA network, the calling UE first connects to the 5G base station, and then attaches to and registers with the 5GC.

Specifically, the calling UE may first send a registration request (registration request) to the 5G SA network. The registration request carries information such as a capability, a registration type, and a security parameter of the calling UE. The capability of the calling UE may include whether to support handover (handover) to a 4G system (evolved packet system, EPS), whether to support redirection (redirection) to the EPS, and the like. Then, the 5G SA network verifies an identity of the calling UE based on information provided by the calling UE. After the verification succeeds, if the 5G SA network accepts the registration request from the calling UE, the 5G SA network feeds back a registration accept (registration accept) message to the calling UE. The registration accept message may include an indication indicating whether the 5G SA network supports VoNR, an indication indicating whether the 5G SA network supports N26 interface-based interoperation, and the like.

Further, after connecting to the 5G SA network, the calling UE may communicate with the 5GC, and use various services provided by the 5GC.

S102: The calling UE registers with an IMS through the 5G SA network.

Specifically, the calling UE first sends a registration request to the IMS. The registration request carries user information of the calling UE, for example, an international mobile subscriber identity (international mobile subscriber identity, IMSI) used as a user identity. Then, the IMS performs authentication on the calling UE based on the information carried in the registration request, and sends a registration complete message after confirming that the calling UE is legal. That the calling UE is legal means that the calling UE has enabled an IMS service, that is, has the right to use audio and video services provided by the IMS, such as a multimedia service and audio and video services.

After connecting to the 5G SA network and registering with the IMS, the calling UE can use a VoNR voice solution provided by the 5GS.

S103: The calling UE calls the called UE through VoNR.

In this embodiment of this application, the calling UE may trigger step S103 in response to the received user operation. That is, the calling UE may call the called UE through VoNR in response to the user operation.

The user operation may be an operation (for example, a tap operation) performed by the user on a latest contact option displayed on a screen of the calling UE, or may be an operation performed by the user on a contacts interface displayed on the screen of the calling UE, or may be any other user operation used to trigger to initiate a call to another UE. This is not limited in this embodiment of this application.

In this embodiment of this application, for the process in which the calling UE calls the called UE through VoNR in step S103, refer to the process described in step a to step k in FIG. 1. Details are not described herein again.

Figure 3:
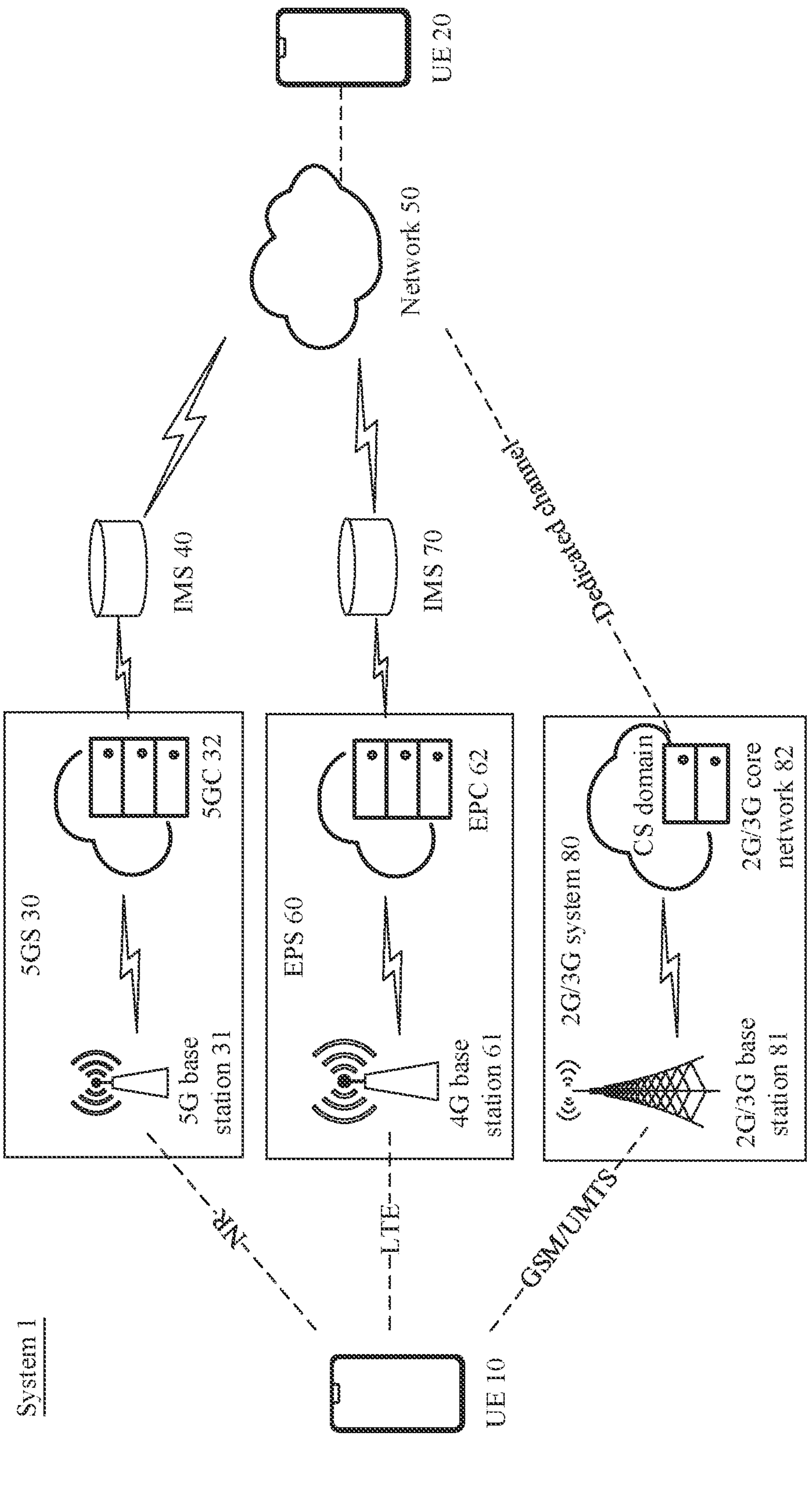
FIG. 3 is a schematic diagram of an architecture of a communications system according to an embodiment of this application.

For descriptions of the system architecture in the solution of this application: The following describes a communications system 1 according to an embodiment of this application with reference to FIG. 3. FIG. 3 shows an example of an architecture of a communications system 1.

As shown in FIG. 3, the communications system 1 may include UE 10, UE 20, a 5G system (5G system, 5GS) 30, an IMS 40, and a network 50. The 5GS 30 and the IMS 40 are connected.

In some embodiments, the UE 10 may initiate a call request to the UE 20 through the 5G system 30 and the IMS 40, that is, by using a VoNR voice solution. In this case, the UE 10 is calling UE, and the UE 20 is called UE. The method for improving a telephone call completion rate in an SA network provided in embodiments of this application is described in the following embodiments by using an example in which the UE 10 initiates a call to the UE 20.

The UE 10 may include a smartphone (for example, a mobile phone equipped with an Android system or an IOS system), a tablet computer, a notebook computer, a palmtop computer, a mobile internet device (mobile internet device, MID), a wearable device (for example, a smart watch or a smart band), or another device that access the internet. The UE 20 may be a smartphone, a wearable device (for example, a smart watch or a smart band), a tablet computer, a notebook computer, a landline telephone, another device that can access the internet, or the like.

User information is stored in the UE 10. The user information may include an IMSI, and may be stored in a subscriber identity module (subscriber identity module, SIM) card of the UE 10. The UE 10 may use the user information as an identity, initiate a call to the UE 20 by using various voice solutions, and perform audio and video communication after the UE 20 accepts the call.

The UE 20 is connected to the IMS 40 through the network 50. Both signaling and data received or transmitted by the UE 20 are transmitted through the network 50. The network 50 may include but is not limited to a 2G/3G network, an LTE network, a 5G SA network, an IMS network, or a public switched telephone network (public switched telephone network, PSTN). This is not limited in this embodiment of this application. It should be noted that an architecture of the network 50 to which the called UE 20 is connected is similar to an architecture of a network to which the calling UE 10 is connected. FIG. 3 is a simplified figure. For ease of description, the architecture of the network 50 and a process of transmitting signaling and data are no longer described in detail.

As shown in FIG. 3, a deployment manner of the 5GS 30 is standalone (standalone, SA). The 5GS 30 includes a 5G base station 31 and a 5GC 32. The 5G base station 31 is connected to the 5GC 32, and the 5GC 32 is connected to the IMS 40.

The 5G base station 31 may be a next generation NodeB (next generation NodeB, gNB). The gNB may be connected to the UE 10, and communicate with the UE 10 by using a 5G NR access technology, that is, the gNB and the UE 10 communicate through an NR link.

The 5GC 32 is configured to: switch, forward, connect, and route data. A network element in the 5GC is a functional virtual unit, and may include but is not limited to an access and mobility management function (access and mobility management function, AMF) unit, a session management function (session management function, SMF) unit, a unified data management (unified data management, UDM) network element, and the like.

The IMS 40 is configured to manage IP data packets obtained by packaging multimedia data such as a voice and a video, distinguish between signaling parts and multimedia data parts of these IP data packets, and transmit the multimedia data parts in the IP data packets between the UE 10 and the UE 20, to provide audio and video services for the UE 10. The IMS 40 may mainly include a call session control function (call session control function, CSCF) entity and a home subscriber server (home subscriber server, HSS). The CSCF is configured to control signaling, authentication, and cooperation with another network entity in a multimedia call session process to control a sessions, and the like. The HSS is configured to manage user data.

It may be understood that because the 5GS 30 is connected to the IMS 40, the 5GS 30 may package, as the IP data packet, the multimedia data in a process in which the UE 10 initiates a call to and communicates with the UE 20, and transmit the IP data packet to the UE 20 through the IMS 40. That is, the 5GS 30 can provide IMS-based audio and video services on a circuit switched (circuit switch, PS) session, that is, the 5GS 30 supports a VoNR voice service. Therefore, the UE 10 may initiate a call to the UE 20 through VoNR.

Refer to FIG. 3. The communications system 1 may further include an EPS 60 and an IMS 70. The EPS 60 is connected to the IMS 70 to ensure that the EPS 60 supports VoLTE.

In some embodiments, the UE 10 initiates a call request to the UE 20 through the EPS 60 and the IMS 70, that is, by using a VoLTE voice solution.

The EPS 60 includes a 4G base station 61 and a 4G core network (evolved packet core, EPC) 52. The 4G base station 61 is connected to the EPC 62, and the EPC 62 is connected to the network 50 through the IMS 70.

The 4G base station 61 may be an evolved NodeB (evolved NodeB, eNB). In this embodiment of this application, when the UE 10 is located within a signal coverage area of the 4G base station 61, the UE 10 may be connected to the 4G base station 61, and communicate with the 4G base station 61 through an LTE link.

The EPC 62 mainly includes the following network elements: a mobility management entity (mobility management entity, MME), a serving gateway (serving gateway, SGW), a packet data network gateway (packet data network gateway. PGW), a home subscriber server (home subscriber server, HSS), an application server (application server, AS), and the like. Main functions of the MME include access control, mobility management, attachment and detachment, session management (for example, setup, modification, and release of a bearer), and the like. The SGW is mainly configured to: route and forward a data packet. Main functions of the PGW include a user-based packet filtering function, a lawful interception function, an IP address assignment function, and the like. The HSS is configured to store user subscription information, subscription data of a user, location information of a mobile user, and the like.

A structure and a function of the IMS 70 are similar to those of the IMS 40. For details, refer to the related descriptions of the IMS 40. The IMS 70 and the IMS 40 may be a same IMS, or may be different IMSs. This is not limited in this embodiment of this application.

It may be understood that because the EPS 60 is connected to the IMS 70, the EPS 60 may package, as the IP packet, the multimedia data in a process in which the UE 10 initiates a call to and communicate with the UE 20, and transmit the IP packet to the UE 20 through the IMS 70. That is, the EPS 60 can provide IMS-based audio and video services on a PS session, that is, the EPS 60 supports a VoLTE voice service. Therefore, the UE 10 may initiate a call to the UE 20 through VoLTE.

In the VoNR voice service, call data in a call process is carried by the 5GS. In the VoLTE voice service, call data in a call process is carried by the EPS.

Refer to FIG. 3. The communications system 1 may further include a 2G/3G system 80. The 2G/3G system 80 may include a 2G/3G base station 81 and a 2G/3G core network 82. The 2G/3G base station 81 is connected to the 2G/3G core network 82, and the 2G/3G core network 82 is connected to the network 50 through a dedicated channel.

In some embodiments, the UE 10 initiates a call to the UE 20 through the 2G/3G system 80, that is, based on a CS domain.

The 2G base station may be a base station subsystem including a base transceiver station (base transceiver station. BTS) and a base station controller (base station controller, BSC), and the 3G base station may be a NodeB. The UE 10 may communicate with the 2G base station through a global system for mobile communications (global system for mobile communications, GSM) link. The UE 10 may communicate with the 3G base station through universal mobile telecommunications system (universal mobile telecommunications system. UMTS) link.

The 2G/3G core network 82 includes a CS domain, and the 2G/3G system 80 can provide audio and video services on a CS session, that is, the 2G/3G system 80 supports a CS domain-based voice solution. The CS domain-based voice solution means that an exclusive channel is established between two or more UEs through a conventional CS domain, and audio and video communication is performed through the channel. Therefore, the UE 10 may initiate a call to the UE 20 through the CS domain.

It may be understood that the units shown in FIG. 3 do not constitute a specific limitation on the communications system 1, and the communications system 1 may further include more or fewer units than those shown in the figure, or combine some units, or split some units, or have different unit arrangements.

Based on the foregoing system architecture and various voice solutions, this application provides a method for improving a telephone call completion rate in an SA network in a scenario (that is, Scenario 1) in which the calling UE resides in the LTE network and the called UE resides in the 5G SA network. When the calling UE fails to call the called UE through VoLTE, the calling and called ends cooperatively execute a corresponding call saving policy: The calling UE initiates a CSFB call retry on LTE. The called UE falls back from the 5G SA network to the LTE network, and cooperates with the calling UE to complete the call retry. In this way, a probability that the UE successfully initiates a call can be improved, a call requirement of a user can be met, and call experience of the user can be ensured.

Based on the foregoing system architecture and various voice solutions, this application provides another method for improving a telephone call completion rate in an SA network in a scenario (that is, Scenario 2) in which both the calling UE and the called UE reside in the 5G SA network. When the calling UE fails to call the called UE through VoNR or EPS fallback, the calling and called ends cooperatively execute a corresponding call saving policy: The calling UE falls back from the 5G SA network to an LTE network, and initiates an IMS domain-based call retry through VoLTE, or initiates a CSFB call retry on LTE after the VoLTE call fails. The called UE falls back from the 5G SA network to the LTE network, or falls back from the LTE network to a CS domain, and cooperates with the calling UE to complete the call retry. In this way, a probability that the UE successfully initiates a call can be improved, a call requirement of a user can be met, and call experience of the user can be ensured.

In general, in a scenario in which a call initiated by the calling UE to the called UE through the IMS domain is abnormal when the calling UE resides in the LTE network or the 5G SA network and the called UE resides in the 5G SA network, the solution of this application is as follows: The calling and called ends cooperatively execute a corresponding call saving policy: The calling UE performs a call retry. The called UE falls back to the LTE network or the CS domain, and cooperates with the calling UE to complete the call retry. In this way, a probability that the UE successfully initiates a call can be improved, a call requirement of a user can be met, and call experience of the user can be ensured.

It should be noted that, in the solution of this application, the call saving policy cooperatively executed by the calling and called ends includes but is not limited to the foregoing solution, and also includes various possible call saving policies, and may be specifically determined based on actual use requirements. This is not limited in embodiments of this application. Various possible saving policies are described below by using examples respectively from perspectives of the calling end and the called end.

On the one hand, from a perspective of the calling end (the calling UE or first UE), in a scenario in which a call initiated by the calling UE to the called UE through the IMS domain is abnormal, details are as follows:

(1) When the calling UE resides in LTE and the IMS domain-based call initiated through VoLTE on LTE fails, the calling UE may continue to reside in LTE and initiate a CSFB call retry on LTE. Optionally, during the call retry, the calling UE suppresses NR measurement, and after a call setup phase ends, cancels suppression of the NR measurement.

Suppressing the NR measurement refers to suppressing measurement on an NR neighboring cell by the called UE.

(2) When the calling UE resides in NR and an IMS domain-based call initiated through VoNR or EPS fallback on NR fails, the calling UE may use at least one of the following three call saving policies;

Saving policy 1: The calling UE finds LTE through network searching, and initiates an IMS domain-based call retry through VoLTE on LTE. Optionally, during the call retry, the calling UE suppresses NR measurement and after a call setup phase ends, cancels suppression of the NR measurement.

Saving policy 2: The calling UE may disable an SA capability, and de-register SA. The calling UE initiates an IMS domain-based call retry through VoLTE on LTE after falling back to the LTE network. After a call ends, the calling UE re-enables the SA capability to avoid impact of a change of a UE capability on a call process.

Saving policy 3: The calling UE reports an LTE B1 event to a network, and triggers the network side to indicate the calling UE to redirect or be handed over to LTE. Then, the calling end initiates an IMS domain-based call retry through VoLTE on LTE after falling back to the LTE network. Optionally, during the call retry, the calling UE suppresses NR measurement, and after a call setup phase ends, cancels suppression of the NR measurement.

Saving policy 4: The calling UE prohibits the calling UE from residing in an NR serving cell of a second public land mobile network (Public Land Mobile Network, PLMN), and triggers the calling UE to reside in an LTE serving cell of the second PLMN, where the second PLMN is a PLMN with which the calling UE has registered.

For example, a PLMN of China Mobile is 46000, a PLMN of China Unicom is 46001, and a PLMN of China Telecom is 46011. It is assumed that the PLMN with which the calling UE has registered is 46000. In response to a fact that the call is abnormally released by the network in the setup phase, the calling UE may prohibit the calling UE from residing in the NR serving cell of 46000, and trigger the calling UE to reside in the LTE serving cell of 46000, so that the calling UE falls back to LTE.

In this embodiment of this application, if the calling UE falls back to LTE by disabling the 5G SA capability, after the call ends, the calling UE re-enables the 5G SA capability to avoid impact of the change of the UE capability on the call process. If the calling UE falls back to LTE through network searching, handover, or redirection, the calling UE no longer suppresses the NR measurement after the call is successfully established (that is, after the called UE receives the call) or the call ends (for example, a failure scenario).

On the other hand, from a perspective of the called end (the called UE or second UE), in a scenario in which a call initiated by the calling UE to the called UE through the IMS domain is abnormal, the called UE may use any one of the following three call saving policies:

Saving policy 1: The called UE disables a 5G SA capability, and de-registers a 5G SA network. The called UE may start a timer during falling back, and cancel suppression of 5G SA when the timer expires and the called UE is not in a call state.

Saving policy 2: Assuming that NR does not meet a resident condition, the called UE is triggered to search for a network and fall back to LTE. Optionally, the called UE may start the timer when the called UE falls back to LTE, suppress the NR measurement during starting of the timer, and cancel suppression of the NR measurement when the timer T1 expires and the called UE is not in a call state.

Saving policy 3: The called UE reports an LTE B1 event (refer to related descriptions below), and triggers a network side to indicate the called UE to redirect or be handed over to LTE. Optionally, the called UE may start the timer when the called UE falls back to LTE, suppress the NR measurement during starting of the timer, and cancel suppression of the NR measurement when the timer T1 expires and the called UE is not in a call state.

Saving policy 4: The called UE prohibits the called UE from residing in an NR serving cell of a first PLMN, and triggers the called UE to reside in an LTE serving cell of the first PLMN, where the first PLMN is a PLMN with which the called UE has registered. Optionally, the called UE may start the timer when the called UE falls back to LTE, suppress the NR measurement during starting of the timer, and cancel suppression of the NR measurement when the timer T1 expires and the called UE is not in a call state.

For example, it is assumed that the PLMN with which the called UE has registered is 46001. In response to a fact that the call is abnormally released by the network in the setup phase, the called UE may prohibit the called UE from residing in the NR serving cell of 46001, and trigger the called UE to reside in the LTE serving cell of 46001, so that the called UE falls back to LTE.

It should be noted that the called UE starts the timer when finding that the call is abnormally released and attempts to fall back to LTE.

It may be understood that a function that the called end starts the timer is represented as follows: Because the calling end performs the call retry, there is usually a time limit, for example, within approximately 1 minute. Therefore, the called end may start the timer to cooperate with the calling end within the time period to initiate a call retry. If the called UE has not received a call request after the timer expires, the called UE considers that there is no need to continue saving.

For example, when the called UE is in a screen-off state, duration of a first timer is first duration.

For example, when the called UE is in a screen-on state, the UE is running a first-type application in the foreground, and a data flow corresponding to the first-type application is transmitted through a network other than a wireless communication network, or when the called UE is in the screen-on state, and the called UE is running a second-type application in the foreground or is not running an application in the foreground, the duration of the first timer is second duration.

The first duration is greater than the second duration. For example, the first duration is 30 minutes, and the second duration is 3 minutes.

The network other than the wireless communication network may include a wireless local area network, for example, a Wi-Fi network.

The first-type application is one or more game applications that need to be run by the called UE in an online manner. It may be understood that the first-type application may not include a standalone game application because the standalone game application may support running when the UE is not networked.

The second-type application may be an application other than the first-type application. The second-type application may include a standalone game application that does not need to be run by the UE in an online manner.

The following describes, by using examples in Embodiment 1, a specific implementation in which the method provided in this application is applied to Scenario 1 (a scenario in which a call initiated through an IMS domain fails when calling UE resides in an LTE network and called UE resides in a 5G SA network), and describes, by using examples in Embodiment 2, a specific implementation in which the method provided in this application is applied to Scenario 2 (a scenario in which a call initiated through an IMS domain fails when both calling UE and called UE reside in a 5G SA network).

Embodiment 1

In the solution of this application, in a scenario in which a call made through an IMS domain fails when calling UE resides in an LTE network and called UE resides in a 5G SA network, considering that the call may fail because the called UE resides in a problematic SA cell, the solution provided in this application is as follows: When the calling UE fails to call the called UE through the IMS domain, the calling and called ends cooperatively execute a call saving policy: After identifying that the call is abnormally released, the calling UE initiates a CSFB call retry on LTE. The called UE falls back to LTE, and cooperates with the calling UE to complete the call retry.

Figure 4:
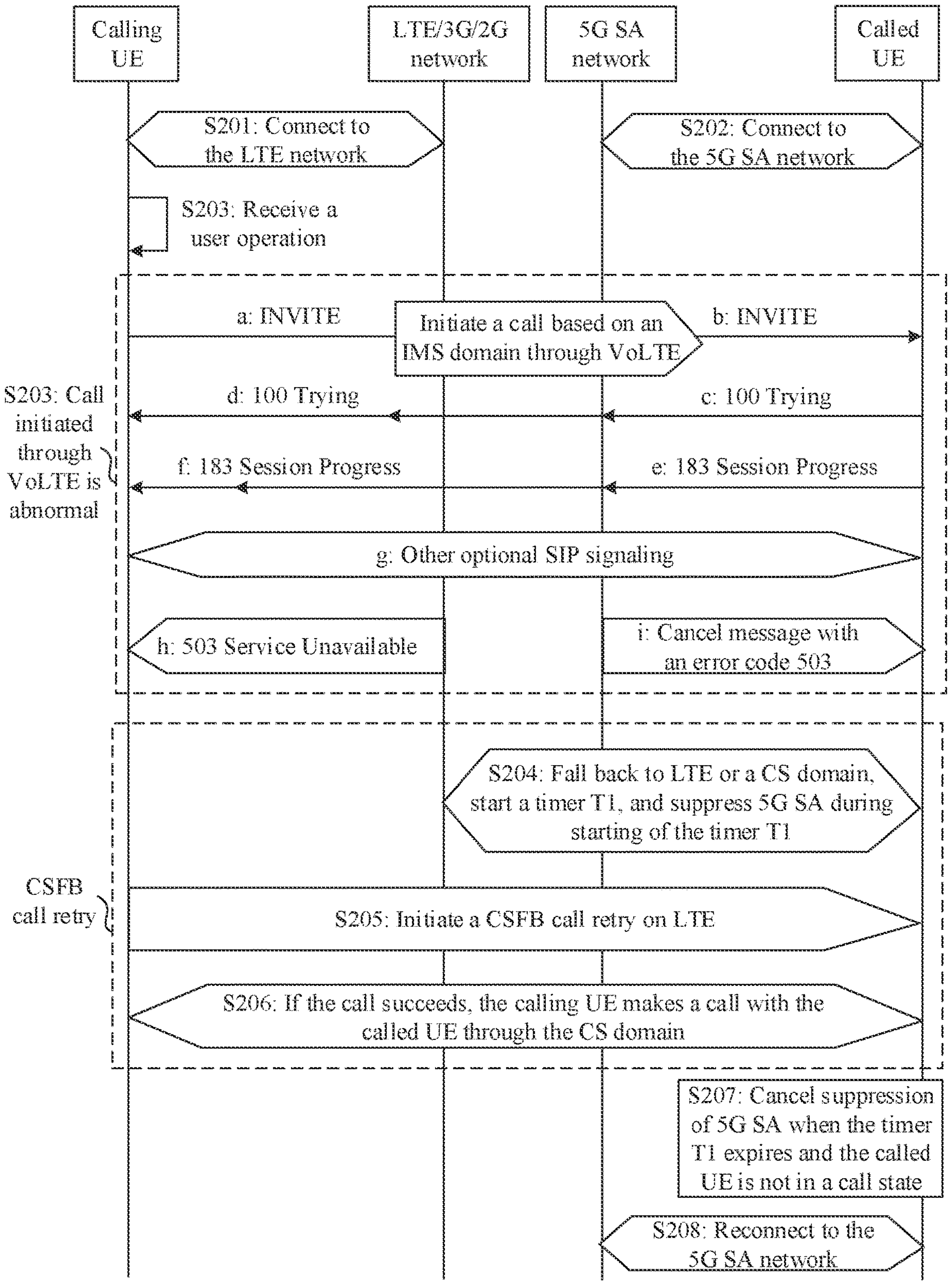
FIG. 4 is a schematic flowchart of a method for improving a telephone call completion rate in an SA network in a scenario in which a call fails when calling UE resides in an LTE network and called UE resides in a 5G SA network according to an embodiment of this application.

FIG. 4 is a schematic flowchart of a method for improving a telephone call completion rate in an SA network according to Embodiment I of this application in a scenario in which a call initiated through an IMS domain fails when calling UE resides in an LTE network and called UE resides in a 5G SA network.

As shown in FIG. 4, the method may include the following steps:

S201: The calling UE connects to a 4G LTE network.

The calling UE further registers with an IMS through the LTE network, so the LTE network supports VoLTE.

S202: The called UE connects to a 5G SA network.

The called UE supports 5G and SA networking manners. That the UE supports 5G means that the UE supports a NAS layer protocol of a 5GC and supports a 5G frequency band.

An execution sequence of S201 and S202 is not limited in this embodiment of this application.

S203: The calling UE initiates a call to the called UE through VoLTE in response to a received user operation, and therefore the call fails.

For detailed descriptions of the user operation, refer to the detailed descriptions of the user operation in the foregoing embodiment. Details are not described herein again.

Assuming that the calling UE has enabled an IMS voice service, when the calling UE resides in the LTE network and receives the user operation, the calling UE may initiate an IMS domain-based call to the called UE through VoLTE in response to the received user operation. After the call is initiated, the call may succeed, or the call may be abnormal or fail as described in FIG. 1.

That the call fails means that the calling UE fails to call the called UE. The call initiated by the calling UE to the called UE through VoLTE fails, that is, an IMS session fails to be established between the calling UE and the called UE. A reason why the call initiated by the calling UE to the called UE through VoLTE fails may include but is not limited to the following: The network side abnormally releases a bearer, a SIP response fails, and the like. SIP is a multimedia communication protocol at an application layer, and is used to create, modify, and release sessions of one or more participants.

It should be noted that, in a scenario in which the calling UE initiates a call to the called UE based on an IMS domain through VoLTE and the call fails, the solution provided in this application is mainly represented as follows: After receiving error indication information about the call failure, the calling UE and the called UE respectively identify, based on the error indication information, that the call is abnormally released, and then the calling UE and the called UE cooperatively execute a corresponding call saving policy. For example, the calling UE performs a call retry, for example, continues to perform the call retry through VoLTE, or initiates a CSFB call retry on LTE. The called UE falls back from the 5G SA network to the LTE network, or falls back from the LTE network to the CS domain, and cooperates with the calling UE to complete the call retry. A specific implementation process is described in detail in the following steps.

S204: When the called UE identifies that the call is abnormally released, the called UE falls back to LTE or the CS domain, starts the timer T1 during falling back, and suppresses 5G SA during starting of the timer T1.

The 5G SA capability may be disabled before the timer T1 expires, and/or the NR measurement may be suppressed during starting of the timer. Details may be determined based on actual use requirements. This is not limited in this embodiment of this application.

When the calling UE fails to call the called UE through VoLTE, the called UE receives error indication information 1, where the error indication information 1 is used to indicate that the call request is received but the call is abnormally released, for example, a cancel message and indicates that an error code is 503, the called UE can identify, based on the error indication information, that the call is abnormally released, and then the called UE executes a corresponding call saving policy: The called UE falls back to the LTE network or the CS domain to avoid a case in which the call is abnormally released because an SA cell in which the called UE resides is problematic.

It should be noted that, when the call is abnormally released, the called UE may fall back from the 5G SA network to the LTE network, or may fall back from the LTE network to the 2G/3G network. Details may be specifically determined based on actual use requirements. This is not limited in this embodiment of this application. Descriptions are provided in this embodiment by using an example in which the called UE falls back from the 5G SA network to the LTE network.

After the called UE falls back to the LTE network, IMS domain-based registration is completed.

In this embodiment of this application, there may be the following three manners in which the called UE falls back to the LTE network:

Manner 1: The called UE may disable the 5G SA capability, and de-register the 5G SA network to fall back to the LTE network.

Optionally, the called UE may start the timer when the called UE falls back to LTE, and disable the 5G SA capability before the timer expires.

Optionally, the called UE may cancel suppression of 5G SA when the timer expires and the called UE is not in a call state.

Manner 2: The called UE may perform a network searching procedure, and independently connect to the LTE network.

For example, assuming that NR does not meet a resident condition, the called UE may be triggered to search for a network and fall back to LTE.

Specifically, the called UE may independently find a cell of a 4G base station on an LTE frequency band, and select the cell for residence. After residing in the cell of the 4G base station, the called UE performs a radio resource control (radio resource control, RRC) connection establishment process and a random access process between the called UE and the cell to establish a connection to the cell, that is, connect to the 4G base station. After connecting to the 4G base station, the called UE may register with an EPC to use a service provided by the EPC.

That is, in the foregoing manner, the called UE independently falls back from the 5G SA network to the LTE network.

Manner 3: The called UE may report an LTE B1 event to a network side, and trigger the network side to indicate the called UE to redirect or be handed over to LTE.

For example, when the called UE receives a cancel message and indicates that an error code is 503, and quality of a neighboring cell of the LTE network is higher than an absolute threshold 1, the called UE reports the LTE B1 event to the 5G base station. When the called UE receives the cancel message and indicates that the error code is 503, quality of a serving cell of the 5G base station to which the called UE is currently connected is lower than an absolute threshold 2, and the quality of the neighboring cell of the LTE network is higher than an absolute threshold 3, the called UE reports an LTE B2 event to the 5G base station.

The LTE B1 event and the LTE B2 event are events used to start inter-system handover. Herein, an inter-system is an LTE system. When the 5G base station receives the LTE B1 event and/or the LTE B2 event sent by the called UE, the 5G base station starts the inter-system handover, and triggers the called UE to fall back from the 5G SA network to the LTE network.

In this embodiment of this application, the 5G base station may trigger, based on a UE capability and a network deployment status, the called UE to fall back from the 5G SA network to the LTE network in a handover (handover to LTE) manner or a redirect (redirect to LTE) manner. A specific manner specifically used by the called UE to fall back to the LTE network is determined based on the 5G SA network.

It should be noted that when the handover (handover to LTE) manner is used, the called UE disconnects from the 5G SA network after being connected to the LTE network. This manner does not involve air interface resource release and has high efficiency. When the redirect (redirect to LTE) manner is used, the called UE first disconnects from the 5G SA network and then connects to the LTE network. In this manner, air interface resources are released, and the air interface resources need to be reconstructed subsequently.

Optionally, the called UE may start the timer when the called UE falls back to LTE through network searching or by reporting the LTE B1 event, and suppress the NR measurement during starting of the timer.

In the foregoing three manners, the called UE may fall back from the 5G SA network to the LTE network, to cooperate with the calling UE to perform a call retry. For a specific process in which the calling UE performs the call retry, refer to step 205.

In this embodiment of this application, when the called UE identifies that the call is abnormal and starts to fall back to LTE, the called UE starts the timer T1. If the called UE falls back to LTE by disabling the 5G SA capability, the called UE may disable the 5G SA capability before the timer T1 expires. If the called UE falls back to LTE through network searching or by reporting the B1 event, the called UE may suppress the NR measurement during starting of the timer T1.

For example, in this embodiment of this application, when the call is abnormally released, the called UE may initiate a de-registration procedure to the 5G SA network, that is, the called UE may first send a de-registration request to the 5G SA network, and the 5G SA network device may release a context of the called UE in response to the de-registration request, so that the 5G SA capability of the called UE is disabled.

Because the called UE supports 5G and SA networking, after the called UEs fall back from the 5G SA network to the LTE network, in some cases, the EPC may trigger the called UE to reconnect to the 5G SA network. The case in which the EPC may trigger the called UE to reconnect to the 5G SA network may include but is not limited to the following: Network quality of the 5G SA network is higher than network quality of the LTE network, for example, strength of a signal that is of the 5G base station and that is received by the called UE is higher than strength of a signal that is of the 4G base station and that is received by the called UE. In view of this, in this embodiment of this application, in the following manners, the called UE can be prevented from reconnecting to the 5G SA network when the called UE cooperates with the calling UE to perform the call retry.

Manner 1: The called UE may send a network capability message to the EPC (for example, an MME) in a process of falling back to the LTE network, where the network capability message is used to indicate that the called UE does not support 5G and SA networking.

In some embodiments, the called UE may report the network capability message to the EPC in a process of attaching (attaching) to the EPC or a tracking area update (tracking area update, TAU) process, where an IE in the network capability message may include a bit “N1 mode”. When the bit “N1 mode” is set to a first value (for example, 0), the network capability message is used to indicate that the called UE does not support 5G and SA networking. Herein, the called UE sets the bit “N1 mode” to the first value. This can be considered as that the called UE shields a capability of supporting SA by the called UE (disables SA or disables NR).

In Manner 1, the EPC considers that the called UE does not support 5G and SA networking (that is, has disabled the 5G SA capability), that is, the called UE is not triggered to be handed over from the LTE network to the 5G SA network.

Manner 2: After connecting to the LTE network, the called UE suppresses NR measurement or suppresses reporting of an NR B1 event and/or an NR B2 event.

The called UE does not report the NR B1 event and/or the NR B2 event to the network side by suppressing the NR measurement.

Specifically, the NR B1 event and the NR B2 event are events used to start inter-system handover. Herein, an inter-system is a 5G system. That is, after the called UE reports the NR B1 event or the NR B2 event to the EPC, the EPC triggers the called UE to be handed over from the LTE network to the 5G SA network. Specifically, when quality of a neighboring cell of the 5G SA network is higher than an absolute threshold 4, the called UE reports the NR B1 event. When quality of a serving cell of the LTE network to which the called UE is currently connected is lower than an absolute threshold 5, and quality of an inter-system neighboring cell is higher than an absolute threshold 6, the called UE reports the NR B2 event.

In the foregoing manner, the called UE suppresses reporting of the NR B1 event and/or the NR B2 event, and the called UE does not report the NR B1 event or the NR B2 event even if a reporting condition is currently met. In this case, it may be considered that the called UE disables the 5G SA capability. This can avoid a case in which the called UE is handed over from the LTE network to the 5G SA network under triggering of the EPC after falling back from the 5G SA network to the LTE network.

It should be noted that, when the called UE suppresses reporting of the NR B1 event and/or the NR B2 event, the called UE may report the network capability message to the EPC based on an actual situation, and even if the network capability message indicates that the called UE supports 5G and SA networking, a case in which the EPC triggers the called UE to be handed over from the LTE network to the 5G SA network can be avoided.

In step S204, when the call is abnormally released, the called UE performs capability backoff, for example, the called UE may be set not to support the 5G SA capability or the NR capability, or it is assumed that the 5G SA network does not meet a resident condition. In addition, the called UE initiates network searching and resides in the LTE network, to cooperate with the calling UE to complete the call retry. For details about a step in which the calling UE initiates the call retry, refer to step S205 below.

S205: When the call initiated by the calling UE through VoLTE fails, the calling UE initiates a CSFB call retry on LTE.

In this embodiment of this application, the calling UE may initiate the CSFB call retry on LTE.

In some embodiments, the calling UE sends an extended service request (extended service request) to the EPC (for example, an MME), where the extended service request is used to request to fall back to a CS domain. If the EPC (for example, the MME) accepts the extended service request, the EPC triggers the calling UE to fall back to the CS domain.

In some embodiments, the calling UE may perform fall-back cell measurement, and send a measurement report to the 4G base station based on a measurement result. The measurement report may include an identifier of a cell measured by the calling UE, signal strength, and the like, and may be used by the EPS to determine how the calling UE falls back to the CS domain. The EPC may trigger, based on one or more of the UE capability, the network deployment status, or the measurement report, the calling UE to fall back from the LTE network to the CS domain in a handover (handover to CS) manner or a redirect (redirect to CS) manner.

In some embodiments, the EPC may indicate, by using an RRC release message sent to the calling UE, the calling UE to fall back from the LTE network to the CS domain in a redirect manner. In some other embodiments, the EPC may indicate, by using a handover message sent to the calling UE, the calling UE to fall back from the LTE network to the CS domain in a handover manner. That is, the calling UE may fall back to the 3G network or the 2G network in a redirect manner or a handover manner.

Optionally, in this embodiment of this application, the calling UE may determine, in any one of the following cases, that the calling UE fails to call the called UE through VoLTE:

(a) The calling UE receives error indication information 2, where the error indication information 2 is used to indicate that the calling UE fails to call the called UE, for example, a 503 Service Unavailable message. Specifically, in a process in which the calling UE calls the called UE through VoLTE, the call may fail due to various reasons. In this case, a node that learns of call failure information may send the error indication information to the calling UE. The node may be any device in the process of communication between the calling UE and the called UE, for example, a 5G base station, a 5GC, an IMS, or called UE When receiving the error indication information, the calling UE determines that the calling UE fails to call the called UE through VoLTE.

b) The calling UE does not receive, within first duration from a time point of initiating the call through VoLTE, 180 Ringing sent by the called UE. In some embodiments, the calling UE may start, when starting a call to the called UE through VoLTE, a timer whose duration is first duration. When the timer expires and 180 Ringing sent by the called UE is not received, the calling UE determines that the calling UE fails to call the called UE through VoLTE.

Because the LTE network supports both a VoLTE voice solution and a CSFB voice solution, after the call initiated by the calling UE through the VoLTE voice solution fails, the calling UE may further initiate a call to the called UE again through the CSFB voice solution, that is, initiate a CSFB call retry on LTE.

Optionally, if the calling UE fails to call the called UE through the CS domain, the calling UE determines whether duration from a time point of starting the call through VoLTE to a current time point exceeds preset duration. If the duration from the time point of starting the call through VoLTE to the current time point does not exceed the preset duration, steps S204 to S206 are cyclically performed until the called UE is successfully called.

Therefore, in this embodiment of this application, after the call initiated by the calling UE to the called UE through VoLTE fails, the calling UE may initiate the CSFB call retry on LTE until the call succeeds or expires. In this way, it can be ensured as much as possible that the calling UE successfully initiates a call to another UE, to meet a call requirement of the user and ensure call experience of the user.

S206: If the calling UE successfully calls the called UE through CSFB, the calling UE makes an audio and video call with the called UE through the CS domain.

In some embodiments, in a process in which the calling UE calls the called UE through CSFB, if the calling UE receives an ALETING message sent by the called UE, the calling UE determines that the calling UE successfully calls the called UE.

After the calling UE successfully calls the called UE through CSFB, an exclusive channel can be established between the calling UE and the called UE, and audio and video data can be transmitted through the channel.

S207: The called UE cancels suppression of 5G SA if the timer T1 expires and the called UE is not in a call state.

That the called UE cancels suppression of 5G SA may include the following possible cases:

Manner 1: When the called UE falls back to LTE by disabling the 5G SA capability, starts the timer during falling back, and disables the 5G SA capability before the timer expires, that the called UE cancels suppression of 5G SA is specifically: canceling disabling of the 5G SA capability when the timer expires and the called UE is not in the call state.

For example, in a process in which the called UE is attached to the EPC or a TAU process of reporting a network capability message to the EPC (for example, an MME), a bit “N1 mode” may be set to a second value (for example, 1), where the network capability message is used to indicate that the calling UE supports 5G and SA networking. In this way, the called UE recovers the 5G SA capability.

Manner 2: When the called UE falls back to LTE through network searching, starts the timer during falling back, and suppresses NR measurement during starting of the timer, that the called UE cancels suppression of 5G SA is specifically: canceling suppression of the NR measurement when the timer expires and the called UE is not in a call state.

Manner 3: When the called UE reports the LTE B1 event, triggers the network to indicate the UE to redirect or be handed over to LTE, starts the timer during falling back, and suppresses NR measurement during starting of the timer, that the called UE cancels suppression of 5G SA is specifically: canceling suppression of the NR measurement when the timer expires and the called UE is not in the call state.

For example, the called UE may stop suppressing reporting of the NR B1 event and/or the NR B2 event. After the called UE reports the N R B1 event or the NR B2 event to the EPC, the EPC triggers the called UE to be handed over from the LTE network to the 5G SA network.

Duration (also referred to as duration) of the timer T1 may be set based on actual use conditions. This is not limited in this embodiment of this application.

S208: The called UE reconnects to the 5G SA network.

When the called UE cancels suppression of 5G SA, the called UE may reconnect to the 5G SA network, to improve user experience.

In this embodiment of this application, in a scenario in which a call made through an IMS domain fails when the calling UE resides in the LTE network and the called UE resides in the 5G SA network, the calling and called ends cooperatively execute a corresponding call saving policy: The calling UE initiates a CSFB call retry on LTE. The called UE falls back from the 5G SA network to the LTE network, and cooperates with the calling UE to complete the call retry. In this way, a probability that the UE successfully initiates a call can be improved, a call requirement of a user can be met, and call experience of the user can be ensured.

In this solution, the user only needs to perform a dialing operation once, so that the calling UE can initiate calls to the called UE for a plurality of times, and therefore subsequent initiated calls do not require user intervention. Such a solution not only increases a probability that dialing succeeds, but also is almost unaware for the user. Therefore, user experience is good.

Embodiment 2

In this solution of this application, in a scenario in which a call made through an IMS domain fails when both calling UE and called UE reside in a 5G SA network, considering that the call may fail because the calling UE resides in a problematic SA cell, or because the called UE resides in a problematic SA cell, or because both the calling UE and the called UE reside in a problematic SA cell, the solution provided in this application is that when the calling UE fails to call the called UE through the IMS domain, the calling and called ends cooperatively execute a call saving policy: The calling UE falls back to LTE, and initiates a call retry on LTE, for example, initiates an IMS domain-based call retry through VoLTE, or initiates a CSFB call retry on LTE after a call made through VoLTE fails. The called UE falls back to LTE, and cancels suppression of 5G SA after a timer expires, to cooperate with the calling UE to complete the call retry.

Figure 5:
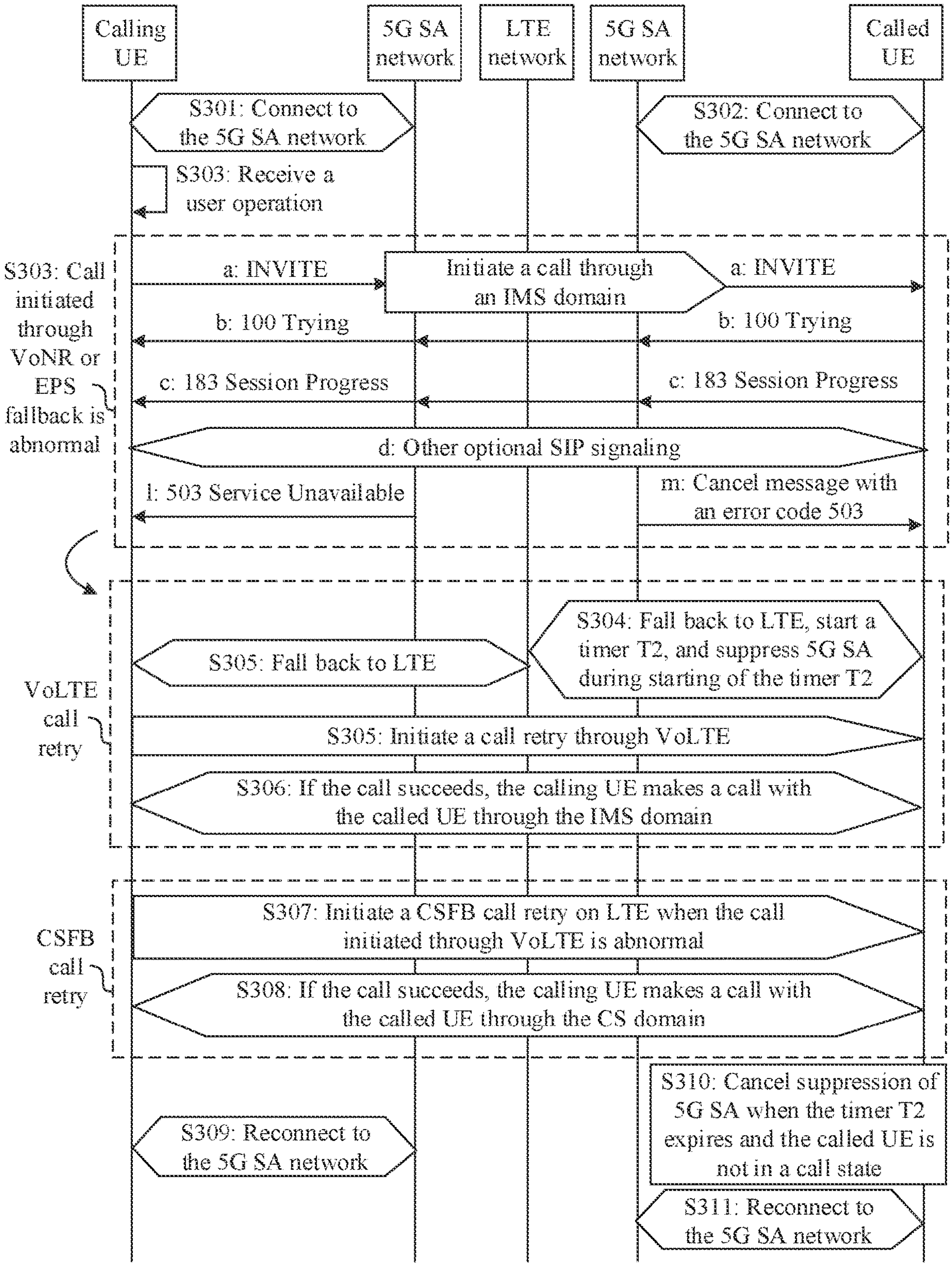
FIG. 5 is a schematic flowchart of a method for improving a telephone call completion rate in an SA network in a scenario in which a call fails when both calling UE and called UE reside in a 5G SA network according to an embodiment of this application.

The following describes, by using examples with reference to FIG. 5, a method for improving a telephone call completion rate in an SA network according to Embodiment 2 of this application. FIG. 5 is a schematic flowchart of a method for improving a telephone call completion rate in an SA network according to Embodiment 2 of this application in a scenario in which a call made through an IMS domain fails when both calling UE and called UE reside in a 5G SA network.

As shown in FIG. 5, the method may include the following steps:

S301: The calling UE connects to a 5G SA network.

The calling UE further registers with an IMS through the 5G SA network, and the 5G SA network supports VoNR or EPS fallback.

S302: The called UE connects to a 5G SA network.

It should be noted that the 5G SA network with which the calling UE registers and the 5G SA network with which the called UE registers may be a same 5G SA network or may be different 5G SA networks. This is not limited in this application. For a specific process in which UE (the calling UE or the called UE) is connected to the 5G SA network, refer to detailed descriptions of the process in which the UE is connected to the 5G SA network in the foregoing embodiment. Details are not described herein again.

In Embodiment 2, both the calling UE and the called UE support 5G and SA networking. An execution sequence of S301 and S302 is not limited in this embodiment of this application.

S303: The calling UE initiates a call to the called UE through VoNR or EPS fallback in response to a received user operation, and therefore the call fails.

For detailed descriptions of the user operation, refer to the detailed descriptions of the user operation in the foregoing embodiment. Details are not described herein again.

Assuming that the calling UE has enabled an IMS voice service, when the calling UE resides in the 5G SA network and receives a user operation, the calling UE may initiate an IMS domain-based call to the called UE through VoNR or EPS fallback in response to the received user operation. After the call is initiated, the call may succeed, or the call may be abnormal or fail as described in FIG. 1.

The call initiated by the calling UE to the called UE through VoNR or EPS fallback fails, that is, an IMS session fails to be established between the calling UE and the called UE. A reason why the call initiated by the calling UE to the called UE through VoNR fails may include but is not limited to the following: The network side abnormally releases a bearer, a SIP response fails, and the like.

It should be noted that, in a scenario in which the calling UE initiates a call to the called UE based on an IMS domain through VoNR or EPS fallback and the call fails, the solution provided in this application is mainly represented as follows: After receiving error indication information about the call failure, the calling UE and the called UE respectively identify, based on the error indication information, that the call is abnormally released, and then the calling UE and the called UE cooperatively execute a corresponding call saving policy. For example, the calling UE performs a call retry, for example, initiates a VoLTE call retry by falling back to the LTE network, or initiates a CSFB call retry on LTE. The called UE falls back to the LTE network or the CS domain, and cooperates with the calling UE to complete the call retry. A specific implementation process is described in detail in the following steps.

S304: When the called UE identifies that the call is abnormally released, the called UE falls back to the LTE network, starts a timer T2 during falling back, and suppresses 5G SA during starting of the timer T2.

It should be noted that, when the call made through VoLTE or EPS fallback fails, the called UE may fall back from the 5G SA network to the LTE network, or may fall back from the LTE network to the 2G/3G network. Details may be determined based on actual use requirements. This is not limited in this embodiment of this application. Descriptions are provided in this embodiment by using an example in which the called UE falls back from the 5G SA network to the LTE network.

In this embodiment of this application, there may be the following three manners in which the called UE falls back to the LTE network:

Manner 1: The called UE may disable the 5G SA capability, and de-register the 5G SA network to fall back to the LTE network. The called UE may start the timer during falling back, and disable the 5G SA capability before the timer expires.

Manner 2: The called UE may perform a network searching procedure, and independently connect to the LTE network. The called UE may start the timer when falling back to LTE through network searching, and suppress the NR measurement during starting of the timer.

Manner 3: The called UE may report an LTE B1 event to a network side, and trigger the network side to indicate the called UE to redirect or be handed over to LTE. The called UE may start the timer when falling back to LTE by reporting the LTE B1 event, and suppress the NR measurement during starting of the timer.

For a specific process in which the called UE falls back from the 5G SA network to the LTE network, refer to related descriptions that the called UE falls back from the 5G SA network to the LTE network in Embodiment 1. Details are not described herein again. The called UE falls back from the 5G SA network to the LTE network, to cooperate with the calling UE to perform a call retry. For a specific process in which the calling UE performs the call retry, refer to step S305.

S305: When the call made through VoNR or EPS fallback, the calling UE falls back to the LTE network, and performs a call retry through VoLTE.

It should be noted that, for a specific manner in which the calling UE falls back from the 5G SA network to the LTE network, refer to related description that the called UE falls back from the 5G SA network to the LTE network in Embodiment 1. Details are not described herein again.

After the called UE successfully resides in the LTE network, IMS domain-based registration is completed. Because the LTE network supports VoLTE, the calling UE may subsequent call the called UE again through VoLTE.

Optionally, after falling back from 5G SA to LTE, the calling UE may suppress 5G SA in a call retry process. For a specific process in which the calling UE suppresses 5G SA, refer to related descriptions that the called UE suppresses 5G SA in Embodiment 1. Details are not described herein again.

In this embodiment of this application, the calling UE may initiate a TAU process to notify a change of 5G network information, and an AMF in a core network of the 5G network may migrate, through an N26 network to an MME in the 4G network, information involved when the calling UE registers with an IMS through an SA network to update an IMS registration status of the calling UE.

In a process in which the calling UE calls the called UE through VoLTE, the calling UE and the called UE each establish a corresponding voice dedicated bearer, and then establish an IMS session based on the established voice dedicated bearer.

In some embodiments, after the call is successfully established, an operation of preventing the EPC from triggering handover of the calling UE from the LTE network to the 5G SA network can be stopped. In this case, because the calling UE and the called UE each have established the voice dedicated bearer, even if the calling UE is handed over from the LTE network to the 5G SA network, handover from VoLTE to VoNR can be used to ensure that the call continues to be maintained.

When successfully calling the called UE through VoLTE, the calling UE continues to perform S306. When failing to call the called UE through VoLTE, the calling UE continues to perform S307 and S308.

S306: if the calling UE successfully calls the called UE through VoLTE, the calling UE makes an audio and video call with the called UE through the IMS domain.

In some embodiments, in a process in which the calling UE calls the called UE through VoLTE or EPS fallback, if the calling UE receives a 180 Ringing message sent by the called UE, the calling UE determines that the calling UE successfully calls the called UE.

After the calling UE successfully calls the called UE through VoLTE, an IMS session can be established between the calling UE and the called UE, and audio and video data can be transmitted based on the IMS session.

S307: If the calling UE fails to call the called UE through VoLTE, the calling UE initiates a CSFB call retry.

The calling UE may initiate the CSFB call retry on the LTE network.

It should be noted that, in the conventional technology, the calling UE initiates a CSFB procedure when the UE does not register with the IMS network or LTE has no or narrow coverage. Different from a condition of initiating the CSFB procedure in the conventional technology, a condition in this embodiment of this application is that when the call initiated by the calling UE through VoLTE is abnormal, the calling UE actively initiates a CSFB procedure for a call retry.

S308: If the calling UE successfully calls the called UE through CSFB, the calling UE makes an audio and video call with the called UE through the CS domain.

Optionally, if the calling UE fails to call the called UE through CSFB, the calling UE determines whether duration from a time point of starting the call through VoNR to a current time point exceeds preset duration.

If the duration from the time point of starting the call through VoNR to the current time point does not exceed the preset duration, steps S304 to S308 are cyclically performed until the called UE is successfully called. In this way, it can be ensured as much as possible that the calling UE successfully calls the called UE within the preset duration, to ensure call experience of the user.

In addition, if the duration from the time point of starting the call through VoNR to the current time point exceeds the preset duration, the calling UE no longer calls the called UE, and reconnects to the 5G SA network. In this way, it can be ensured that the calling UE is connected to a network of an optimal standard in a subsequent running process, to improve a rate of data transmission between the calling UE and a data network, thereby improving user experience.

Optionally, if the calling UE fails to call the called UE within the preset duration, the calling UE no longer calls the called UE, and outputs prompt information. The prompt information is used to indicate that the calling UE fails to call the called UE. For example, the prompt information may be a prompt tone “call failure” played by the calling UE, or may be a text “call failure” displayed on a display. In this way, accurate feedback can be given to the user by using the prompt information, so that the user can learn, within the preset duration, whether the called UE is currently successfully called, to improve user experience.

Further, after the call made through VoLTE succeeds (step S306), or after the call made through CSFB succeeds (step S308), steps S309 to S311 may be performed.

S309: The calling UE reconnects to the 5G SA network.

The calling UE may reconnect to the 5G SA network after a call setup phase ends (for example, call setup succeeds or fails) or the call ends.

It should be noted that if the calling UE suppresses 5G SA in a call retry phase, the calling UE may cancel suppression of 5G SA after a call retry initiated by the calling UE through VoLTE or CSFB succeeds. That is, after the call setup phase ends, the calling UE cancels suppression of 5G SA. Further, when the calling UE cancels suppression of 5G SA, the calling UE may reconnect to the 5G SA network. In this way, it can be ensured that the calling UE is connected to a network of an optimal standard in a subsequent running process, to improve a rate of data transmission between the calling UE and a data network, thereby improving user experience.

That the calling UE cancels suppression of 5G SA may include the following possible cases:

Manner 1: When the calling UE disables a 5G SA capability and initiates a call retry on LTE, that the calling UE cancels suppression of 5G SA is specifically: canceling disabling of the 5G SA capability after the call ends, to avoid impact of a change of a UE capability on a call process.

Manner 2: When the calling UE falls back LTE through network searching for a call retry, and suppresses NR measurement during the call retry, that the calling UE cancels suppression of 5G SA is specifically: canceling suppression of the NR measurement after the call setup phase ends.

Manner 3: When the calling UE reports an LTE B1 event, triggers a network to redirect or be handed over to LTE, then initiates a call retry on LTE, and suppresses NR measurement during the call retry, that the calling UE cancels suppression of 5G SA is specifically: canceling suppression of the NR measurement after the call setup phase ends.

It should be noted that, if the calling UE falls back to LTE by disabling the 5G SA capability (Manner 1), after the call ends, the calling UE re-enables the 5G SA capability to avoid impact of the change of the UE capability on the call process. If the calling UE falls back to LTE through network searching (Manner 2), or through handover or redirection (Manner 3), the calling UE no longer suppresses the NR measurement after the call is successfully established (that is, after the called UE receives the call) or the call ends (for example, a failure scenario). After the call is successfully established, even if the calling UE is handed over from the LTE network to the 5G SA network, handover from VoLTE to VoNR can be used to ensure that the call continues to be maintained.

S310: The called UE cancels suppression of 5G SA if the timer T2 expires and the called UE is not in a call state.

The called UE cancels suppression of 5G SA when the timer T2 expires and the called UE is not in a call state. Duration of the timer T2 may be set based on actual use conditions. This is not limited in this embodiment of this application.

For details about a possible case in which the called UE cancels suppression of 5G SA, refer to related descriptions that the called UE suppresses 5G SA in Embodiment 1. Details are not described herein again.

S311: The called UE reconnects to the 5G SA network.

When the called UE cancels suppression of 5G SA, the called UE may reconnect to the 5G SA network. In this way, it can be ensured that the called UE is connected to a network of an optimal standard in a subsequent running process, to improve a rate of data transmission between the called UE and a data network, thereby improving user experience.

In this embodiment of this application, in a scenario in which the call made through the IMS domain fails when both the calling UE and the called UE reside in the 5G SA network, the calling and called ends cooperatively execute a corresponding call saving policy: The calling UE falls back from the 5G SA network to the LTE network, and performs the call retry through VoLTE, or initiates the CSFB call retry on LTE after the call made through VoLTE fails. The called UE starts the timer, suppresses 5G SA before the timer expires, falls back from the 5G SA network to the LTE network or falls back from the LTE network to the CS domain, and cooperates with the calling UE to complete the call retry. In this way, a probability that the UE successfully initiates a call can be improved, a call requirement of a user can be met, and call experience of the user can be ensured.

In this solution, the user only needs to perform a dialing operation once, so that the calling UE can initiate calls to the called UE for a plurality of times, and perform the call retry by using various voice solutions, and therefore subsequent initiated calls do not require user intervention. Such a solution not only increases a probability that dialing succeeds, but also is almost unaware for the user. Therefore, user experience is good.

Optionally, in Embodiment 1 and Embodiment 2, when determining that a current status of the UE (for example, the calling UE/called UE) meets at least one of the following conditions (1) to (3), the UE may disable the 5G SA capability and fall back to the LTE network:

(1) The UE is in a screen-off state.

When the UE is in the screen-off state, it indicates that the user does not currently use the UE. Therefore, when the UE falls back to the LTE network, it is unaware for the user. Therefore, when the condition (1) is met, the UE may disable the 5G SA capability and fall back to the LTE network.

(2) The UE is in a screen-on state, and a second-type application running by the UE in the foreground is not a game application, or an application is not running in the foreground.

The UE may first determine, based on a user data service status of the UE, whether the UE enables a game mode. For example, if the application running by the UE in the foreground includes the game application, the UE may determine that the UE has enabled the game mode. Then, the UE may compare the application running in the foreground with a preset game application whitelist to determine whether the application running in the foreground is the game application, that is, if the application running in the foreground belongs to the game application whitelist, the application running in the foreground is the game application.

When the application running by the UE in the foreground is not the game application, or the application is not running in the foreground, the UE falls back to the LTE network. This has small impact on the application currently running by the UE. Therefore, when the condition (2) is met, the UE may disable the 5G SA capability and fall back to the LTE network.

(3) The UE is in the screen-on state, the UE is running a first-type application in the foreground, and a data flow corresponding to the first-type application is transmitted through a network other than a wireless communication network.

The first-type application is a game application that needs to be run by the UE in an online manner. The network other than the wireless communication network includes a wireless local area network, for example, a Wi-Fi network.

When the UE is connected to the wireless local area network, the data flow of the UE is transmitted through the wireless local area network but is not transmitted through the wireless communication network, and the UE falls back to the LTE network, which does not affect network access to the UE. Therefore, when the condition (3) is met, the UE may disable the 5G SA capability and fall back to the LTE network.

It should be further noted that if the called UE meets a specific condition, the UE continues to reside in the 5G SA network. The specific condition is as follows: The UE is in the screen-on state, the UE is running the game application in the foreground, and the data flow corresponding to the game application is transmitted through the wireless communication network. That is, when the UE runs the game application in the screen-on state, the UE may not perform actions of disabling the 5G SA capability and falling back to the LTE network, to avoid affecting current user experience.

In this embodiment of this application, in a process of executing a call saving policy, a low-priority SA cell may also be identified to avoid a case in which the UE resides in the low-priority SA cell.

It is assumed that a quantity of times that the calling UE receives 503 Service Unavailable within preset duration (for example, 2 seconds) after the calling UE receives 183 Session Progress is M. It is assumed that a quantity of times that the called UE receives a cancel message and indicates that an error code is 503 within preset duration (for example, 2 seconds) after the called UE sends 183 Session Progress is N. Both M and N are integers.

When it is determined that an SA cell meets both the following conditions (1) and (2), it may be determined that the SA cell is a low-priority SA cell.

Condition (1): The SA cell has no LTE neighboring cell.

Condition (2): M+N is greater than a threshold X in a time period T3. Herein, T3 is duration that can be configured, and X is an integer that can be configured.

Further, after it is determined that the SA cell is the low-priority SA cell (referred to as a problematic SA cell), the problematic SA cell is not resided in the time period T3 when the problematic SA cell and another normal cell exist.

Optionally, after the time period T3, the problematic SA cell may be re-identified as a normal cell.

Optionally, when a plurality of cells in which UE resides within a specific time period are all problematic SA cells, the UE enables a timer to disable the 5G SA capability (disable SA).

According to the foregoing solution, after it is determined that an SA cell is a low-priority SA cell, residing in the problematic SA cell is avoided, to ensure call experience of the user.

It should be noted that in the foregoing embodiment of this application, when a call is abnormally released by a network in a setup phase, a specific implementation of the solution of this application is described by using an example in which the calling UE receives 503 Service Unavailable and the called UE receives the cancel message that carries an abnormal cause value 503. It may be understood that application scenarios of the solutions of this application include but are not limited thereto. In an actual implementation, there may also be another reason why the call is abnormally released by the network in the setup phase. It may be understood that the method provided in embodiments of this application may be applied to various scenarios in which the call is abnormally released by the network in the setup phase, and may be specifically determined based on actual use requirements. This is not limited in embodiments of this application.

It should also be noted that, in embodiments of this application, "greater than" may be replaced with "greater than or equal to", and "less than or equal to" may be replaced with "less than", or "greater than or equal to" may be replaced with "greater than", and "less than" may be replaced with "less than or equal to".

The various embodiments described in this specification may be independent solutions or may be combined based on internal logic, and these solutions fall within the protection scope of this application.

It may be understood that the methods and operations implemented by the UE in the foregoing method embodiments may also be implemented by a component (such as a chip or a circuit) that can be used in the UE.

The method embodiments provided in this application are described above, and apparatus embodiments provided in this application are described below. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes, from a perspective of the method steps, the solutions provided in embodiments of this application. It may be understood that, to implement the foregoing functions, the UE that implements the method includes corresponding hardware structures and/or software modules for performing the functions. A person skilled in the art may be aware that units and algorithm steps in the examples described with reference to embodiments disclosed in this specification can be implemented in this application in a form of hardware or a combination of hardware and computer software. Whether the functions are performed by hardware or computer software driven hardware depends on particular applications and design constraints of the technical solutions. A person skilled in the art may use different methods to implement the described functions for each particular application, but it should not be considered that the implementation goes beyond the protection scope of this application.

In embodiments of this application, the UE may be divided into functional modules based on the foregoing method examples, for example, each functional module may be obtained through division for each corresponding function, or two or more functions may be integrated into one processing module. The integrated module may be implemented in a form of hardware or a software functional module. It should be noted that division into the modules in embodiments of this application is an example and is merely logical function division, and may be other feasible division in an actual implementation. To better implement the method for improving a telephone call completion rate in an SA network provided in embodiments of this application, an embodiment of this application further provides a corresponding apparatus. Descriptions are provided below by using an example in which each functional module is obtained through division for each corresponding function.

Figure 6:
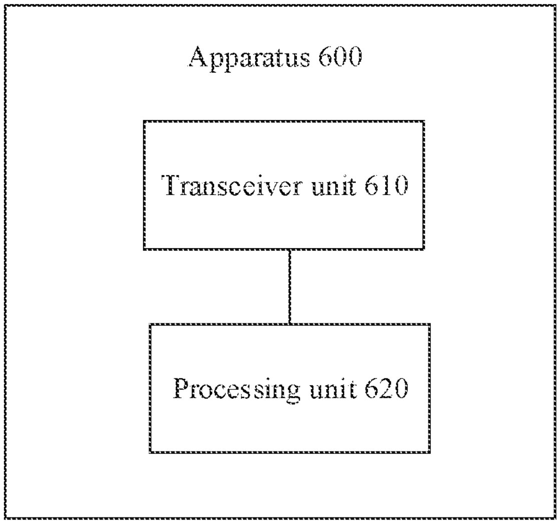
FIG. 6 is a schematic diagram 1 of a structure of an apparatus for improving a telephone call completion rate in an SA network according to an embodiment of this application.

FIG. 6 is a schematic block diagram of an apparatus 600 for improving a telephone call completion rate in an SA network according to an embodiment of this application. The apparatus 600 may be configured to perform the actions performed by the calling end (that is, the first UE) in the foregoing method embodiments. The apparatus 600 includes a transceiver unit 610 and a processing unit 620.

The transceiver unit 610 is configured to initiate a multimedia subsystem IMS domain-based voice call to second UE, where the multimedia subsystem IMS domain-based voice bearer includes a voice over long term evolution VoLTE, or a voice over new radio VoNR, or an evolved packet system fallback EPS fallback. The apparatus 600 resides in a 5G SA network or a long term evolution LTE network, and the second UE resides in the 5G SA network.

The processing unit 620 is configured to: fall back to the LTE network and initiate a VoLTE call retry to the second UE on the LTE network, in response to a fact that the VoNR or EPS fallback call initiated by the apparatus 600 is abnormally released by a network in a setup phase, or initiate a circuit switched fallback CSFB call retry to the second UE on the LTE network in response to a fact that the VoLTE call initiated by the apparatus 600 is abnormally released by the network in the setup phase.

In some embodiments, the transceiver unit 610 is further configured to receive, after receiving a session progress message sent by a network side, a call exception message sent by the network side, where the call exception message carries a cause value 503 indicating that the call is abnormally released in the setup phase.

In some embodiments, the processing unit 620 is further configured to: suppress NR measurement during the VoLTE call retry initiated by the apparatus 600; and cancel suppression of the NR measurement after the call setup phase ends.

In some embodiments, the processing unit 620 is further configured to: disable a 5G SA capability during the VoLTE call retry initiated by the apparatus 600; and re-enable the SA capability after the call between the apparatus 600 and the second UE ends.

In some embodiments, the processing unit 620 is specifically configured to: assuming that an NR serving cell does not meet a resident condition, trigger the apparatus 600 to fall back to the LTE network through network searching: or disable the 5G SA capability, trigger the apparatus 600 to initiate de-registration to the 5G SA network, and fall back from the 5G SA network to the LTE network; or report an LTE B1 event to the network side, and trigger the network side to indicate the apparatus 600 to redirect or be handed over to the LTE network.

In some embodiments, the transceiver unit 610 is further configured to establish a call with the second UE in response to a fact that the apparatus 600 successfully calls the second UE.

In some embodiments, the processing unit 620 is further configured to: identify a first 5G SA cell as a problematic cell when the first 5G SA cell meets a second preset condition: and suppress, in first preset duration, the apparatus 600 to reside in the first 5G SA cell.

The second preset condition may be that a 5G SA cell has no LTE neighboring cell; a value obtained by summing M and N is greater than a preset threshold in the second preset duration; and M is a quantity of times that the apparatus 600 receives the call exception message in the second preset duration after receiving the session progress message, and N is a quantity of times that the second UE receives the call cancel message in the second preset duration after sending the session progress message.

According to the solution provided in this application, in a scenario in which calling UE (that is, the first UE) resides in the LTE network or the 5G SA network and called UE (that is, the apparatus 600) resides in the 5G SA network, when the calling UE fails to call the called UE through an IMS domain (for example, VoNR, EPS fallBack, or VoLTE), the calling and called ends cooperatively execute a corresponding call saving policy: The calling UE performs a call retry, for example, initiates the VoLTE call retry after falling back to LTE when the VoNR or EPS fallback call fails, or initiates the CSFB call retry on LTE when the VoLTE call fails. In this way, a probability that the UE successfully initiates a call can be improved, a call requirement of a user can be met, and call experience of the user can be ensured.

The apparatus 600 according to this embodiment of this application may correspond to the method described in embodiments of this application, and the foregoing and other operations and/or functions of the units in the apparatus 600 are respectively intended to implement the corresponding procedure of the method. For brevity, details are not described herein again.

Figure 7:
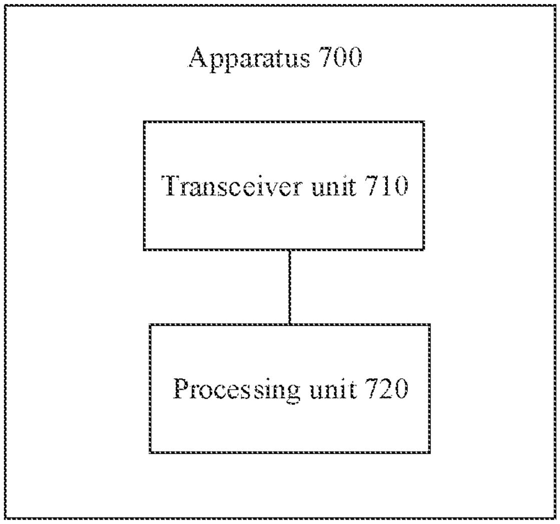
FIG. 7 is a schematic diagram 2 of a structure of an apparatus for improving a telephone call completion rate in an SA network according to an embodiment of this application.

FIG. 7 is a schematic block diagram of an apparatus 700 for improving a telephone call completion rate in an SA network according to an embodiment of this application. The apparatus 70) may be configured to perform the actions performed by the called terminal (that is, the second UE) in the foregoing method embodiments. The apparatus 70) includes a transceiver unit 710 and a processing unit 720.

The transceiver unit 710 is configured to receive a multimedia subsystem IMS domain-based voice call initiated by first UE, where the multimedia subsystem IMS domain-based voice bearer includes a voice over long term evolution VoLTE, or a voice over new radio VoNR, or an evolved packet system fallback EPS fallback. The first UE resides in a 5G SA network or a long term evolution LTE network, and the apparatus 700 resides in the 5G SA network.

The processing unit 720 is configured to fall back to the LTE network or a CS domain in response to a fact that a call is abnormally released by a network in a setup phase.

In some embodiments, the apparatus 700 may fall back from the 5G SA network to the LTE network, or may fall back from the LTE network to the CS domain.

In some embodiments, the transceiver unit 710 is further configured to receive, after sending a session progress message to a network side, a call cancel message sent by the network side, where the call cancel message carries a cause value 503 indicating that the call is abnormally released in the setup phase. The processing unit 720 is specifically configured to fall back to the LTE network or the CS domain in response to the call cancel message.

In some embodiments, the apparatus 700 may support VoNR and VoLTE.

In some embodiments, the processing unit 720 is specifically configured to: if the apparatus 700 meets a first preset condition, fall back from the 5G SA network to the LTE network in response to a fact that the call is abnormally released by the network in the setup phase. The first preset condition is that the UE does not enable a game mode, and/or the UE is in a screen-off state.

In some embodiments, the processing unit 720 is specifically configured to: disable a 5G SA capability, trigger the apparatus 700 to initiate de-registration to the 5G SA network, and fall back from the 5G SA network to the LTE network; or assuming that an NR serving cell does not meet a resident condition, and trigger the apparatus 700 to fall back from the 5G SA network to the LTE network through network searching: or report an LTE B1 event to the network side, and trigger the network side to indicate the apparatus 700 to redirect or be handed over to the LTE network.

In some embodiments, the processing unit 720 is further configured to: start a first timer when the apparatus 700 falls back to the LTE network, and suppress 5G SA during starting of the first timer.

In some embodiments, the processing unit 720 is specifically configured to: start a first timer when the apparatus 700 falls back to the LTE network, and suppress NR measurement and/or disable a 5G SA capability during starting of the first timer.

In some embodiments, the transceiver unit 710 is further configured to send a UE capability message to the LTE network after the apparatus 700 falls back to the LTE network, where the UE capability message is used to indicate that the apparatus 700 does not support 5G.

In some embodiments, the processing unit 720 is further configured to cancel suppression of the 5G SA when the first timer expires and the apparatus 700 is not in a call state.

In some embodiments, the transceiver unit 710 is further configured to send a UE capability message to the LTE network after the call is successfully established, where the UE capability message is used to indicate that the apparatus 700 supports 5G.

In some embodiments, the processing unit 720 is further configured to re-reside in the 5G SA network after the call between the first UE and the apparatus 700 ends.

In some embodiments, the processing unit 720 is further configured to: identify a first 5G SA cell as a problematic cell when the first 5G SA cell meets a second preset condition; and suppress, in first preset duration, the second UE to reside in the first 5G SA cell.

The second preset condition is that a 5G SA cell has no LTE neighboring cell; a value obtained by summing M and N is greater than a preset threshold in the second preset duration; and M is a quantity of times that the first UE receives the call exception message in the second preset duration after receiving the session progress message, and N is a quantity of times that the apparatus 700 receives the call cancel message in the second preset duration after sending the session progress message.

According to the solution provided in this application, in a scenario in which calling UE (that is, the first UE) resides in the LTE network or the 5G SA network and called UE (that is, the apparatus 700) resides in the 5G SA network, when the calling UE fails to call the called UE through an IMS domain (for example, VoNR, EPS fallBack, or VoLTE), the calling and called ends cooperatively execute a corresponding call saving policy: The calling UE performs a call retry. The called UE falls back to the LTE network or the CS domain, and cooperates with the calling UE to complete the call retry. The called UE falls back to the LTE network or the CS domain to avoid a case in which the call is abnormally released because an SA cell in which the called UE resides is problematic. In this way, a probability that the UE successfully initiates a call can be improved, a call requirement of a user can be met, and call experience of the user can be ensured.

The apparatus 700 according to this embodiment of this application may correspond to the method described in embodiments of this application, and the foregoing and other operations and/or functions of the units in the apparatus 700 are respectively intended to implement the corresponding procedure of the method. For brevity, details are not described herein again.

Figure 8:
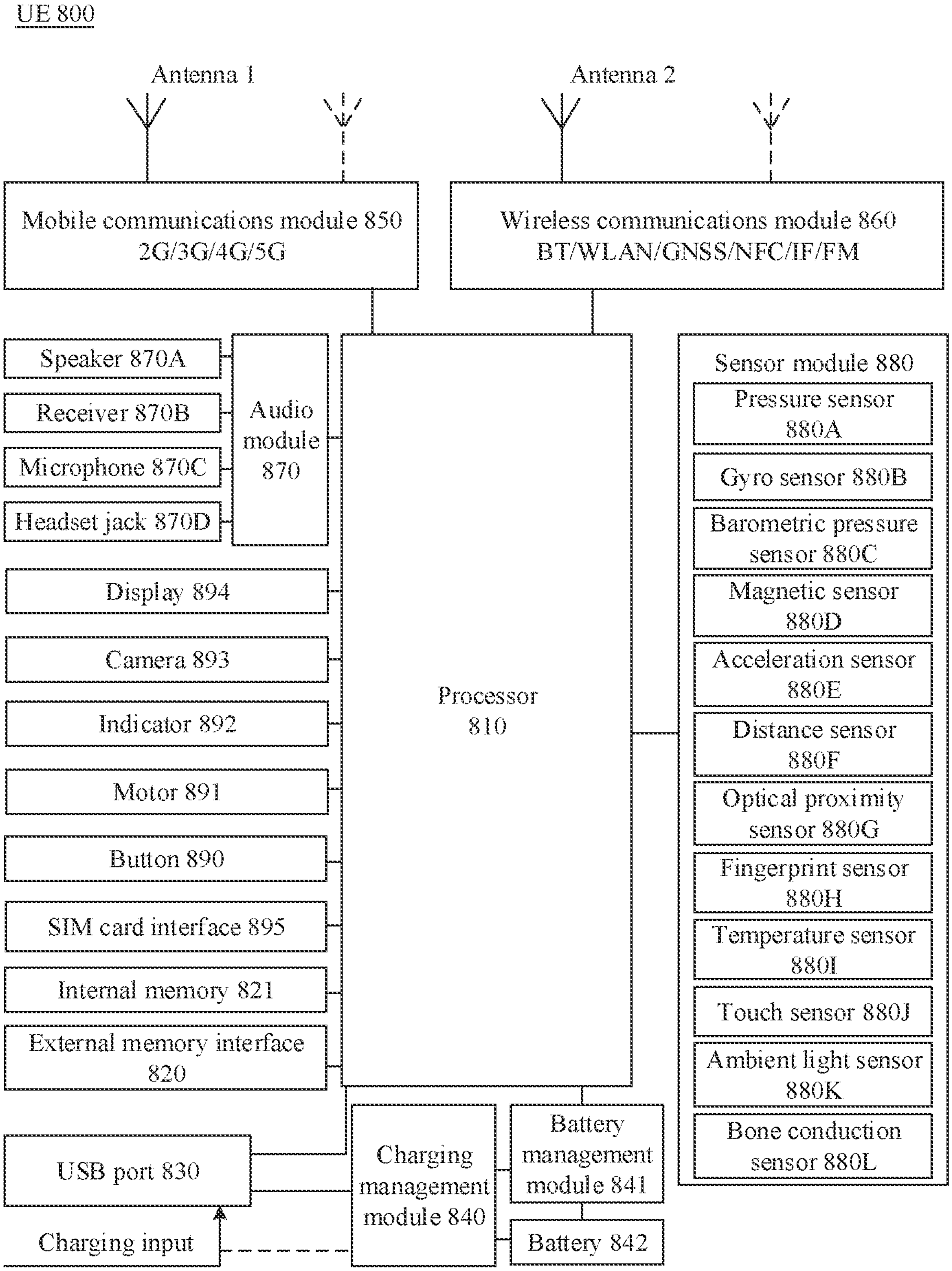
FIG. 8 is a schematic diagram of a structure of UE according to an embodiment of this application.

FIG. 8 is a schematic diagram of a structure of UE 800 according to an embodiment of this application. The UE 800 may be the calling UE or the called UE mentioned in the foregoing embodiment.

The UE 800 may include a processor 810, an external memory interface 820, an internal memory 821, a universal serial bus (universal serial bus, USB) port 830, a charging management module 840, a power management module 841, a battery 842, an antenna 1, an antenna 2, a mobile communications module 850, a wireless communications module 860, an audio module 870, a speaker 870A, a receiver 870B, a microphone 870C, a headset jack 870D, a sensor module 880, a button 890, a motor 891, an indicator 892, a camera 893, a display 894, a subscriber identification module (subscriber identification module, SIM) card interface 895, and the like. The sensor module 880 may include a pressure sensor 880A, a gyro sensor 880B, a barometric pressure sensor 880C, a magnetic sensor 880D, an acceleration sensor 880E, a distance sensor 880F, an optical proximity sensor 880G, a fingerprint sensor 880H, a temperature sensor 880I, a touch sensor 880J, an ambient light sensor 880K, a bone conduction sensor 880L, and the like.

It may be understood that the structure shown in this embodiment of this application does not constitute a specific limitation on the UE 800. The UE 800 may include more or fewer components than those shown in the figure, or combine some components, or split some components, or have different component arrangements. The components shown in the figure may be implemented in hardware, software, or a combination of software and hardware.

The processor 810 may include one or more processing units. For example, the processor 810 may include an application processor (application processor, AP), a modem (modem) processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. A memory may be further disposed in the processor 810, and is configured to store instructions and data. It should be noted that the processor 810 in the UE 800 shown in FIG. 8 may correspond to the processing unit 620 in the apparatus 600 in FIG. 6 or the processing unit 720 in the apparatus 700 in FIG. 7.

A wireless communication function of the UE 800 may be implemented by the antenna 1, the antenna 2, the mobile communications module 850, the wireless communications module 860, the modem processor, the baseband processor, and the like.

The antenna 1 and the antenna 2 are configured to: transmit and receive electromagnetic wave signals. Each antenna in the UE 800 may be configured to cover one or more communication bands. Different antennas may also be multiplexed to improve antenna utilization. For example, the antenna 1 may be multiplexed as a diversity antenna in a wireless local area network. In some other embodiments, the antenna may be used in combination with a tuning switch.

The mobile communications module 850 may provide a wireless communication solution that includes 2G/3G/4G/5G or the like and that is applied to the UE 800. The mobile communications module 850 may include at least one filter, a switch, a power amplifier, a low noise amplifier (low noise amplifier, LNA), and the like. The mobile communications module 850 may receive an electromagnetic wave through the antenna 1, perform processing such as filtering and amplification on the received electromagnetic wave, and transmit a processed electromagnetic wave to the modem processor for demodulation. The mobile communications module 850 may further amplify a signal modulated by the modem processor, and convert the signal into an electromagnetic wave for radiation through the antenna 1. In some embodiments, at least some functional modules of the mobile communications module 850 may be disposed in the processor 810. In some embodiments, at least some functional modules of the mobile communications module 850 may be disposed in a same device as at least some modules of the processor 810.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to a baseband processor for processing. The low-frequency baseband signal is processed by the baseband processor and then transmitted to an application processor. The application processor outputs a sound signal through the audio device (which is not limited to the speaker 870A, the receiver 870B, or the like), or displays an image or a video through the display 894. In some embodiments, the modem processor may be an independent device. In some other embodiments, the modem processor may be independent of the processor 810, and disposed in a same device as the mobile communications module 850 or another functional module. In some embodiments, the UE 800 may include two modem processors, one modem processor corresponds to 4G, and the other modem processor corresponds to 5G.

The wireless communications module 860 may provide a wireless communication solution that includes a wireless local area network (wireless local area network, WLAN) (for example, a wireless fidelity (wireless fidelity, Wi-Fi) network), Bluetooth (Bluetooth, BT), and the like and that is applied to the UE 800. The wireless communications module 860 may be one or more devices that integrate at least one communications processor module. The wireless communications module 860 receives an electromagnetic wave through the antenna 2, performs frequency modulation and filtering processing on an electromagnetic wave signal, and sends a processed signal to the processor 810. The wireless communications module 860 may further receive a to-be-sent signal from the processor 810, perform frequency modulation and amplification on the signal, and convert the signal into an electromagnetic wave for radiation through the antenna 2.

In some embodiments, in the UE 800, the antenna 1 is coupled to the mobile communications module 850, and the antenna 2 is coupled to the wireless communications module 860, so that the UE 800 can communicate with a network and another device by using a wireless communications technology. The wireless communications technology may include a GSM, a GPRS, CDMA, WCDMA, TD-SCDMA, LTE, NR, BT, a WLAN, NFC, FM, an IR technology, and/or the like.

In this embodiment of this application, in a scenario in which calling UE resides in a 5G SA network and called UE resides in the 5G SA network, when the calling UE fails to call the called UE through an IMS domain, the calling and called ends cooperatively execute a call saving policy:

A wireless communications module of the calling UE is configured to: under an indication of a processor of the calling UE, fall back from the 5G SA network to an LTE network, and perform a call retry through VoLTE, or initiate a CSFB call retry on LTE after a VoLTE call fails.

A wireless communications module of the called UE is configured to: under an indication of a processor of the called UE, suppress, by the called UE, 5G SA and fall back to the LTE network or a CS domain, and cooperate with the calling UE to complete the call retry.

In this way, a probability that the UE successfully initiates a call can be improved, a call requirement of a user can be met, and call experience of the user can be ensured. Herein, for specific operations implemented by the wireless communications module 860, refer to the related descriptions in the foregoing embodiments. Details are not described herein again.

Alternatively; in this embodiment of this application, in a scenario in which calling UE resides in an LTE network and called UE resides in a 5G SA network, when the calling UE fails to call the called UE through an IMS domain, the calling and called ends cooperatively execute a call saving policy:

A wireless communications module of the calling UE is configured to initiate a CSFB call retry on LTE under an indication of a processor of the calling UE.

A wireless communications module of the called UE is configured to: under an indication of a processor of the called UE, suppress, by the called UE, 5G SA and fall back to the LTE network or a CS domain, and cooperate with the calling UE to complete the call retry.

In this way, a probability that the UE successfully initiates a call can be improved, a call requirement of a user can be met, and call experience of the user can be ensured.

Herein, for specific operations implemented by the wireless communications module of the calling UE and the wireless communications module of the called UE, refer to the related descriptions in the foregoing embodiments. Details are not described herein again.

The UE 800 implements a display function through the GPU, the display 894, the application processor, and the like. The GPU is a microprocessor for image processing, and is connected to the display 894 and the application processor. The GPU is configured to perform mathematical and geometric calculation and graphics rendering. The processor 810 may include one or more GPUs that execute program instructions to generate or change display information.

The display 894 is configured to display an image, a video, and the like. The display 894 includes a display panel.

The UE 800 may implement a photographing function through the ISP, the camera 893, the video codec, the GPU, the display 894, the application processor, and the like. The ISP is configured to process data fed back by the camera 893. The camera 893 is configured to capture a static image or a video. The digital signal processor is configured to process a digital signal, and may further process another digital signal in addition to the digital image signal. For example, when the UE 800 selects a frequency, the digital signal processor is configured to perform Fourier transform or the like on frequency energy. The video codec is configured to: compress or decompress a digital video.

The internal memory 821 may be configured to store computer-executable program code, where the executable program code includes instructions. The internal memory 821 may include a program storage area and a data storage area. The program storage area may store an operating system, an application required by at least one function (such as a sound playing function or an image playing function), and the like.

The UE 800 can implement an audio function such as music playing or recording by using the audio module 870, the speaker 870A, the receiver 870B, the microphone 870C, the headset jack 870D, the application processor, and the like.

The pressure sensor 880A is configured to sense a pressure signal, and can convert the pressure signal into an electrical signal. In some embodiments, the pressure sensor 880A may be disposed on the display 894.

The touch sensor 880J is also referred to as a "touch panel". The touch sensor 880J may be disposed on the display 894, and the touch sensor 880J and the display 894 constitute a touchscreen. The touch sensor 880W is configured to detect a touch operation performed on or near the touch sensor 880J. The touch sensor may transfer the detected touch operation to the application processor to determine a type of the touch event. A visual output related to the touch operation may be provided through the display 894. In some other embodiments, the touch sensor 880J may also be disposed on a surface of the UE 800 at a location different from that of the display 894.

The SIM card interface 895 is configured to connect to a SIM card. The SIM card may be inserted into the SIM card interface 895 or detached from the SIM card interface 895, to implement contact with or separation from the UE 800. The UE 800 may support one or N SIM card interfaces, where N is a positive integer greater than 1. The SIM card interface 895 may support a nano-SIM card, a micro-SIM card, a SIM card, and the like. A plurality of cards may be simultaneously inserted into a same SIM card interface 895. The plurality of cards may be of a same type or different types. The SIM card interface 895 may also be compatible with different types of SIM cards. The SIM card interface 895 may also be compatible with an external storage card. The UE 800 interacts with a network by using the SIM card to implement functions such as conservation and data communication. In some embodiments, the UE 800 uses an eSIM, that is, an embedded SIM card. The eSIM card may be embedded in the UE 800 and cannot be separated from the UE 800.

In this embodiment of this application, the SIM card is used to store user information, where the user information may include an IMSI. The UE 800 may register with a network by using the user information as an identity.

The UE 800 in this embodiment of this application may be a smartphone (such as a mobile phone carrying an Android system or an iOS system), a tablet computer, a notebook computer, a palmtop computer, a mobile internet device (MID, mobile internet device), a wearable device (such as a smart watch or a smart band), or another device that can access the internet.

It should be understood that the UE 800 in this embodiment of this application may correspond to the apparatus 600 in the foregoing embodiment of this application. The foregoing and other operations and/or functions of the units in the apparatus 600 are respectively used to implement the corresponding procedures of the foregoing methods. Details are not described herein again.

It should be understood that the UE 800 in this embodiment of this application may correspond to the apparatus 700 in the foregoing embodiment of this application. The foregoing and other operations and/or functions of the units in the apparatus 700 are respectively used to implement the corresponding procedures of the foregoing methods. Details are not described herein again.

Figure 9:
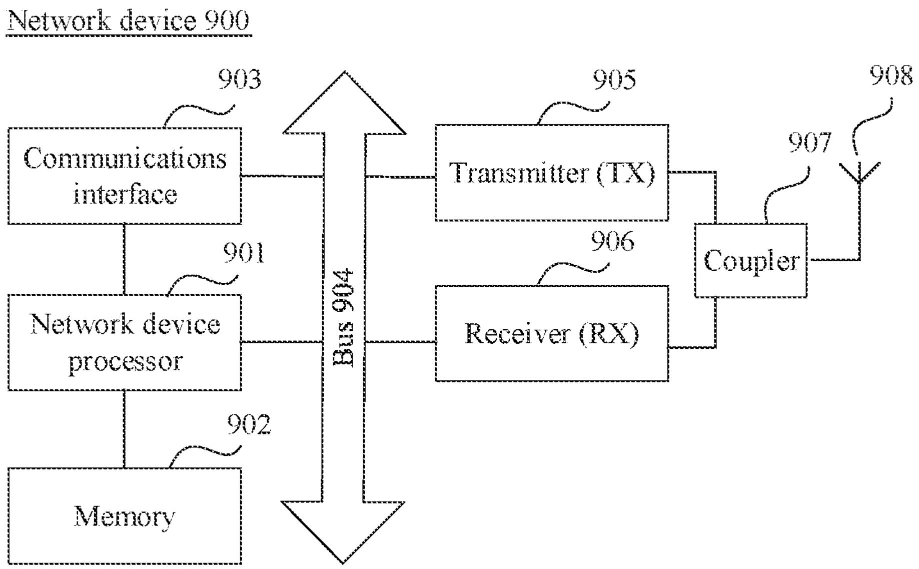
FIG. 9 is a schematic diagram of a structure of a network device according to an embodiment of this application.

FIG. 9 is a schematic diagram of a structure of a network device 900 according to an embodiment of this application. In some embodiments, the network device 900 may be the 5G base station in the foregoing embodiment. In some other embodiments, the network device 900 may be the 4G base station in the foregoing embodiment.

As shown in FIG. 9, the network device 900 may include one or more processors 901, a memory 902, a communications interface 903, a transmitter 905, a receiver 906, a coupler 907, and an antenna 908. These components may be connected through a bus 904 or in another manner. An example in which these components are connected through the bus is used in FIG. 9.

The communications interface 903 may be used by the network device 900 to communicate with another communications devices, for example, UE, a 5GC, or another network device. Specifically, the communications interface 903 may be a 5G or future new radio communications interface. Not limited to a wireless communications interface, the network device 900 may also be provided with a wired communications interface 903 to support wired communication, for example, a backhaul link between one network device 900 and another network device 900 may be a wired communication connection.

In some embodiments of this application, the transmitter 905 and the receiver 906 may be considered as a wireless modem.

The transmitter 905 may be configured to transmit a signal that is output by the processor 901. The receiver 906 may be configured to receive a signal. In the network device 900, there may be one or more transmitters 905 and receivers 906. The antenna 908 may be configured to convert electromagnetic energy in a transmission line into an electromagnetic wave in free space, or to convert an electromagnetic wave in free space into electromagnetic energy in a transmission line. The coupler 907 may be configured to divide a mobile communication signal into a plurality of paths, which are allocated to a plurality of receivers 906. It may be understood that the antenna 908 of the network device may be implemented as a large-scale antenna array.

The memory 902 is coupled to the processor 901, and is configured to store various software programs and/or a plurality of sets of instructions. Specifically, the memory 902 may include a high-speed random access memory, and may also include a non-volatile memory, such as one or more magnetic disk storage devices, a flash memory device, or another non-volatile solid-state storage device.

The memory 902 may store an operating system (briefly referred to as a system below), for example, an embedded operating system such as uCOS, VxWorks, or RTLinux. The memory 902 may further store a network communication program. The network communication program may be used to communicate with one or more additional devices, one or more UEs, or one or more network devices.

In this embodiment of this application, the processor 901 may be configured to: read and execute computer-readable instructions. Specifically, the processor 901 may be configured to, invoke a program stored in the memory 902, for example, an implementation program on the side of the network device 900 of the method for improving a telephone call completion rate in an SA network provided in one or more embodiments of this application, and execute instructions included in the program.

It should be noted that the network device 900 shown in FIG. 9 is merely an implementation of this embodiment of this application. In actual application, the network device 900 may further include more or fewer components. This is not limited herein.

Implementations of this application may be arbitrarily combined to achieve different technical effects.

Optionally, in some embodiments, an embodiment of this application further provides a computer-readable medium. The computer-readable medium stores program code. When the computer program code is run on a computer, the computer is enabled to perform the methods in the foregoing aspects.

Optionally, in some embodiments, an embodiment of this application further provides a computer program product. The computer program product includes computer program code. When the computer program code is run on a computer, the computer is enabled to perform the methods in the foregoing aspects.

In embodiments of this application, the UE or the network device includes a hardware layer, an operating system layer running above the hardware layer, and an application layer running on the operating system layer. The hardware layer may include hardware such as a central processing unit (central processing unit, CPU), a memory management unit (memory management unit, MMU), and memory (also referred to as main memory). An operating system of the operating system layer may be any one or more computer operating systems that implement service processing through a process (process), such as a Linux operating system, a Unix operating system, an Android operating system, an iOS operating system, or a Windows operating system. The application layer may include applications such as a browser, an address book, word processing software, and instant messaging software.

Embodiments of this application do not specially limit a specific structure of an execution body of the method provided in embodiments of this application, provided that communication can be performed according to the method provided in embodiments of this application by running a program that records code of the method provided in embodiments of this application. For example, the method provided in embodiments of this application may be performed by UE or a network device, or a functional module that is in the UE or the network device and that can invoke and execute the program.

Aspects or features of this application may be implemented as methods, apparatuses, or articles using standard programming and/or engineering techniques. The term "article" used in this specification may cover a computer program accessible from any computer-readable device, a carrier, or a medium. For example, the computer-readable medium may include but is not limited to a magnetic storage device (such as a hard disk, a floppy disk, or a magnetic tape), an optical disk (such as a compact disc (compact disc, CD) or a digital versatile disc (digital versatile disc, DVD)), a smart card, and a flash memory device (such as an erasable programmable read-only memory (erasable programmable read-only memory. EPROM), a card, a stick, or a key drive).

The various storage media described in this specification may represent one or more devices and/or other machine-readable media for storing information. The term "machine-readable medium" may include but is not limited to a wireless channel and various other media that can store, include, and/or carry instructions and/or data.

It should be understood that the processor mentioned in embodiments of this application may be a central processing unit (central processing unit, CPU), or may be another general-purpose processor, a digital signal processor (digital signal processing, DSP), an application-specific integrated circuit (application-specific integrated circuits, ASIC), a field programmable gate array (field programmable gate array, FPGA), another programmable logic device, a discrete gate, a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both the volatile memory and the non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example but not limitation, there may be the following plurality of forms of RAMs: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, another programmable logic device, a discrete gate, a transistor logic device, or a discrete hardware component, the memory (a storage module) may be integrated in the processor.

It should be further noted that the memory described in this specification is intended to include but is not limited to these memories and any other proper types of memories.

A person of ordinary skill in the art may be aware that units and steps in the examples described with reference to embodiments disclosed in this specification can be implemented in electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

A person skilled in the art may clearly understand that for the convenience and brevity, for a specific working process of the system, the apparatus, and the unit described above, reference may be made to the corresponding process in the foregoing method embodiment. Details are not described herein again.

In the several embodiments provided in this application, it should be understood that the disclosed system, apparatus, and method may be implemented in another manner. For example, the foregoing apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be or may not be physical units, and may be located in one position, or may be distributed in a plurality of different network units. Some or all of the units may be selected based on an actual requirement to achieve the objectives of the solutions of embodiments.

In addition, functional units in embodiments of this application may be integrated into one unit, or each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a computer software product. The computer software product is stored in a storage medium, and the computer software product includes several instructions for instructing a computer device (which may be a personal computer, a server, a network device, or the like) to perform all or some of the steps of the methods in embodiments of this application. The storage medium may include but is not limited to any medium that can store program code such as a USB flash drive, a removable hard disk, a ROM, a RAM, a magnetic disk, or an optical disc.

All technical and scientific terms used in this specification have the same meanings as those usually understood by a person skilled in the art to which this application belongs, unless otherwise defined. The terms used in this specification of this application are merely intended to describe specific embodiments, and are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications system, comprising:

a first user equipment (UE) capable of operating in at least a 5G standalone (SA) network and a long term evolution (LTE) network; and a second UE in the 5G standalone (SA) network, wherein the first UE is configured to:

initiate an IP multimedia subsystem (IMS) domain-based voice call to the second UE, wherein an IMS domain-based voice bearer comprises a voice over LTE (VoLTE), or a voice over new radio (VoNR), or an evolved packet system (EPS) fallback;

in response to a VoNR or EPS fallback call initiated by the first UE being abnormally released by a network in a setup phase, fall back to the LTE network and initiate a VoLTE call retry to the second UE on the LTE network; and in response to a VoLTE call initiated by the first UE being abnormally released by the network in the setup phase, initiate a circuit switched fallback (CSFB) call retry to the second UE on the LTE network, wherein the second UE is configured to:

fall back to the LTE network or a circuit switched (CS) domain in response to a call being abnormally released by the network in the setup phase;

start a first timer when the second UE falls back to the LTE network;

suppress 5G SA after starting the first timer;

cancel suppression of 5G SA when the first timer expires and the second UE is not in a call state; and send a UE capability message to the LTE network after the second UE falls back to the LTE network, wherein the UE capability message indicates that the second UE does not support 5G.

2. The communications system of claim 1, wherein the second UE is further configured to receive, after sending a session progress message to a network side, a call cancel message from the network side, wherein the call cancel message carries a cause value 503 indicating that the call is abnormally released in the setup phase, and wherein the first UE is further configured to receive, after receiving the session progress message from the network side, a call exception message from the network side, wherein the call exception message carries the cause value 503 indicating that the call is abnormally released in the setup phase.

3. The communications system of claim 2, wherein the second UE is configured to:

identify a first 5G SA cell as a problematic cell when the first 5G SA cell meets a second preset condition; and suppress, for a first preset duration, the second UE to reside in the first 5G SA cell, wherein the second preset condition is that the first 5G SA cell has no LTE neighboring cell, and a value obtained by summing M and N is greater than a preset threshold, and wherein M is a quantity of times that the first UE receives the call exception message in a second preset duration after receiving the session progress message, and N is a quantity of times that the second UE receives the call cancel message in the second preset duration after sending the session progress message.

4. The communications system of claim 1, wherein the second UE supports VONR and VoLTE.

5. The communications system of claim 1, wherein in response to the call being abnormally released by the network in the setup phase, the second UE is configured to:

continue to reside in the 5G SA network responsive to the second UE being in a screen-on state, the second UE is running a first-type application in a foreground, and a data flow corresponding to the first-type application is transmitted through a wireless communication network; or fall back from the 5G SA network to the LTE network or the CS domain responsive to the second UE meeting a first preset condition.

6. The system of claim 5, wherein the first preset condition is any one of the following:

the second UE is in a screen-off state;

the second UE is in the screen-on state, the second UE is running the first-type application in the foreground, and the data flow corresponding to the first-type application is transmitted through a network other than the wireless communication network; or the second UE is in the screen-on state, and the second UE is running a second-type application in the foreground or is not running an application in the foreground.

7. The communications system of claim 6, wherein the first-type application is a game application configured to be run by the second UE in an online manner, and the second-type application is an application other than the first-type application.

8. The communications system of claim 6, wherein a duration of the first timer is a first duration when the second UE is in the screen-off state, wherein the duration of the first timer is a second duration when either c) the second UE is in the screen-on state, the second UE is running the first-type application in the foreground, and the data flow corresponding to the first-type application is transmitted through the network other than the wireless communication network, or d) the second UE is in the screen-on state, and the second UE is either e) running the second-type application in the foreground or f) not running an application in the foreground, and wherein the first duration is greater than the second duration.

9. The communications system of claim 8, wherein the first duration is 30 minutes, and the second duration is 3 minutes.

10. The communications system of claim 1, wherein the second UE is configured to:

disable a 5G SA capability, initiate de-registration to the 5G SA network, and fall back from the 5G SA network to the LTE network; or fall back from the 5G SA network to the LTE network through network searching responsive to a new radio (NR) serving cell not meeting a resident condition; or report an LTE B1 event to a network side, and trigger the network side to indicate the second UE to redirect or be handed over to the LTE network; or be prohibited from residing in an NR serving cell of a first public land mobile network (PLMN), and reside in an LTE serving cell of the first PLMN, wherein the first PLMN is a PLMN with which the second UE has registered.

11. The communications system of claim 1, wherein the second UE suppressing 5G SA comprises the second UE suppressing new radio (NR) measurement, and/or the second UE disabling a 5G SA capability.

12. The communications system of claim 1, wherein the first UE is configured to:

suppress new radio (NR) measurement during the VoLTE call retry initiated by the first UE; and cancel suppression of the NR measurement after the setup phase ends.

13. The communications system of claim 1, wherein the first UE is configured to:

disable 5G SA capability during the VoLTE call retry initiated by the first UE; and re-enable the 5G SA capability after a call between the first UE and the second UE ends.

14. A user equipment (UE), applied to a called end, wherein the UE is second UE, the second UE comprising:

one or more processors; and one or more memories coupled to the one or more processors and storing instructions that, when executed by the one or more processors, cause the second UE to be configured to:

receive an IP multimedia subsystem (IMS) domain-based voice call from a first UE, wherein an IMS domain-based voice bearer comprises a voice over long term evolution (VoLTE), or a voice over new radio (VoNR), or an evolved packet system (EPS) fallback, and wherein the first UE is capable of operating in at least a 5G standalone (SA) network and a long term evolution (LTE) network, and the second UE resides in the 5G SA network;

fall back to the LTE network or a circuit switched (CS) domain in response to a call being abnormally released by a network in a setup phase;

start a first timer when the second UE falls back to the LTE network;

suppress 5G SA after starting the first timer; and cancel suppression of 5G SA when the first timer expires and the second UE is not in a call state, wherein in response to the call being abnormally released by the network in the setup phase, the second UE is configured to:

continue to reside in the 5G SA network responsive to the second UE being in a screen-on state, the second UE is running a first-type application in a foreground, and a data flow corresponding to the first-type application is transmitted through a wireless communication network; or fall back from the 5G SA network to the LTE network or the CS domain responsive to the second UE meeting a first preset condition, wherein the first preset condition is any one of the following:

the second UE is in a screen-off state;

the second UE is in the screen-on state, the second UE is running the first-type application in the foreground, and the data flow corresponding to the first-type application is transmitted through a network other than the wireless communication network; or the second UE is in the screen-on state, and the second UE is running a second-type application in the foreground or is not running an application in the foreground, wherein a duration of the first timer is a first duration when the second UE is in a screen-off state, and wherein the duration of the first timer is a second duration when either a) the second UE is in a screen-on state, the second UE is running the first-type application in the foreground, and the data flow corresponding to the first-type application is transmitted through the network other than the wireless communication network, or b) the second UE is in the screen-on state, and the second UE is either c) running the second-type application in the foreground or d) not running an application in the foreground, and wherein the first duration is greater than the second duration.

15. The UE of claim 14, wherein the first-type application is a game application configured to be run by the second UE in an online manner, and the second-type application is an application other than the first-type application.

16. The UE of claim 14, wherein the first duration is 30 minutes, and the second duration is 3 minutes.

17. A user equipment (UE), applied to a called end, wherein the UE is second UE, the second UE comprising:

one or more processors; and one or more memories coupled to the one or more processors and storing instructions that, when executed by the one or more processors, cause the second UE to be configured to:

receive an IP multimedia subsystem (IMS) domain-based voice call from a first UE, wherein an IMS domain-based voice bearer comprises a voice over long term evolution (VoLTE), or a voice over new radio (VoNR), or an evolved packet system (EPS) fallback, and wherein the first UE is capable of operating in at least a 5G standalone (SA) network and a long term evolution (LTE) network, and the second UE resides in the 5G SA network;

fall back to the LTE network or a circuit switched (CS) domain in response to a call being abnormally released by a network in a setup phase;

start a first timer when the second UE falls back to the LTE network;

suppress 5G SA after starting the first timer;

cancel suppression of 5G SA when the first timer expires and the second UE is not in a call state;

identify a first 5G SA cell as a problematic cell when the first 5G SA cell meets a second preset condition; and suppress, for a first preset duration, the second UE to reside in the first 5G SA cell, wherein the second preset condition is that the first 5G SA cell has no LTE neighboring cell, and a value obtained by summing M and N is greater than a preset threshold, and wherein M is a quantity of times that the first UE receives a call exception message in a second preset duration after receiving a session progress message, and N is a quantity of times that the second UE receives the call cancel message in the second preset duration after sending the session progress message.

18. The UE of claim 17, wherein in response to the call being abnormally released by the network in the setup phase, the second UE is configured to:

continue to reside in the 5G SA network responsive to the second UE being in a screen-on state, the second UE is running a first-type application in a foreground, and a data flow corresponding to the first-type application is transmitted through a wireless communication network; or fall back from the 5G SA network to the LTE network or the CS domain responsive to the second UE meeting a first preset condition, wherein the first preset condition is any one of the following:

the second UE is in a screen-off state;

the second UE is in the screen-on state, the second UE is running the first-type application in the foreground, and the data flow corresponding to the first-type application is transmitted through a network other than the wireless communication network; or the second UE is in the screen-on state, and the second UE is running a second-type application in the foreground or is not running an application in the foreground.

19. The UE of claim 18, wherein the first-type application is a game application configured to be run by the second UE in an online manner, and the second-type application is an application other than the first-type application.

20. The UE of claim 18, wherein a duration of the first timer is a first duration when the second UE is in a screen-off state, and wherein the duration of the first timer is a second duration when either a) the second UE is in a screen-on state, the second UE is running the first-type application in the foreground, and the data flow corresponding to the first-type application is transmitted through the network other than the wireless communication network, or b) the second UE is in the screen-on state, and the second UE is either c) running the second-type application in the foreground or d) not running an application in the foreground, and wherein the first duration is greater than the second duration.

* * * * *